(12) United States Patent
Lee

(10) Patent No.: US 11,169,335 B2
(45) Date of Patent: Nov. 9, 2021

(54) SLIM CONNECTOR PLUG AND ACTIVE OPTICAL CABLE ASSEMBLY USING SAME

(71) Applicant: GIPARANG INC., Seoul (KR)

(72) Inventor: Sang Don Lee, Guri-si (KR)

(73) Assignee: LIPAC CO., LTD., Seoul (KR)

( * ) Notice: Subject to any disclaimer, the term of this patent is extended or adjusted under 35 U.S.C. 154(b) by 0 days.

(21) Appl. No.: 16/486,932

(22) PCT Filed: Feb. 22, 2018

(86) PCT No.: PCT/KR2018/002181
§ 371 (c)(1),
(2) Date: Aug. 19, 2019

(87) PCT Pub. No.: WO2018/155924
PCT Pub. Date: Aug. 30, 2018

(65) Prior Publication Data
US 2020/0233160 A1    Jul. 23, 2020

(30) Foreign Application Priority Data
Feb. 24, 2017 (KR) .................. 10-2017-0024623

(51) Int. Cl.
*G02B 6/42* (2006.01)

(52) U.S. Cl.
CPC .......... *G02B 6/4214* (2013.01); *G02B 6/4274* (2013.01)

(58) Field of Classification Search
None
See application file for complete search history.

(56) References Cited

U.S. PATENT DOCUMENTS

| | | | |
|---|---|---|---|
| 7,005,719 B2 * | 2/2006 | Masumoto | G02B 6/43 257/432 |
| 7,367,715 B1 * | 5/2008 | Budd | G02B 6/4214 385/100 |

(Continued)

FOREIGN PATENT DOCUMENTS

| | | |
|---|---|---|
| JP | 2002031747 | 1/2002 |
| JP | 2002357745 | 12/2002 |

(Continued)

OTHER PUBLICATIONS

International Search Report—PCT/KR2018/002181 dated Jun. 7, 2018.

*Primary Examiner* — Rhonda S Peace
(74) *Attorney, Agent, or Firm* — Cantor Colburn LLP

(57) ABSTRACT

Provided are a slim connector plug capable of transmitting and receiving a large amount of data at an ultra-high speed and implementing a miniaturized and slimmed structure with a thickness of 1 mm while being manufactured at low cost, and an active optical cable (AOC) assembly using the same. The connector plug includes: an optical sub-assembly in which an optical fiber seating groove on which an optical fiber is mounted is formed on one side of the optical sub-assembly and a reflective surface is formed on an inner end of the optical fiber seating groove; an optical element module having an optical engine stacked on the optical sub-assembly and generating an optical signal or receiving an optical signal; and an optical component installed on the reflective surface of the OSA and transmitting the optical signal between the optical fiber and the optical engine.

18 Claims, 19 Drawing Sheets

(56) References Cited

U.S. PATENT DOCUMENTS

| | | | | |
|---|---|---|---|---|
| 7,500,792 | B2* | 3/2009 | Supper | G02B 6/4201 385/90 |
| 7,547,151 | B2* | 6/2009 | Nagasaka | G02B 6/4214 385/53 |
| 7,780,359 | B2* | 8/2010 | Kondo | G02B 6/4214 385/88 |
| 8,475,054 | B2* | 7/2013 | Shimotsu | G02B 6/4292 385/75 |
| 8,779,583 | B2* | 7/2014 | Pressel | H01L 21/568 257/723 |
| 8,961,039 | B2* | 2/2015 | Sano | G02B 6/428 385/89 |
| 9,105,766 | B2* | 8/2015 | Coffy | G01S 7/481 |
| 9,465,164 | B2* | 10/2016 | Sasaki | G02B 6/43 |
| 9,502,335 | B2* | 11/2016 | Lai | H01L 23/49 |
| 9,864,153 | B2* | 1/2018 | Lee | G02B 6/4256 |
| 9,869,834 | B2* | 1/2018 | Sano | G02B 6/423 |
| 10,203,459 | B2* | 2/2019 | Lee | G02B 6/4206 |
| 10,649,159 | B2* | 5/2020 | Lee | G02B 6/4256 |
| 2007/0292081 | A1* | 12/2007 | Hashimoto | G02B 6/4277 385/52 |
| 2012/0319304 | A1* | 12/2012 | Pressel | B81C 1/0023 257/787 |
| 2013/0343711 | A1* | 12/2013 | Sano | G02B 6/4214 385/88 |
| 2016/0299302 | A1* | 10/2016 | Sano | G02B 6/4212 |
| 2017/0131487 | A1* | 5/2017 | Lee | H01L 23/5386 |
| 2019/0137706 | A1* | 5/2019 | Xie | G02B 6/43 |
| 2020/0233160 | A1* | 7/2020 | Lee | G02B 6/4274 |

FOREIGN PATENT DOCUMENTS

| | | |
|---|---|---|
| JP | 2006215288 | 8/2006 |
| JP | 2016500840 | 1/2016 |
| KR | 20060054914 | 5/2006 |
| KR | 20140059869 | 5/2014 |

* cited by examiner

SLIM CONNECTOR PLUG AND ACTIVE OPTICAL CABLE ASSEMBLY USING SAME

TECHNICAL FIELD

The present invention relates to a slim connector plug and an active optical cable assembly using the same, and more particularly, to a slim connector plug capable of transmitting/receiving large-capacity data at ultra high speed, and implementing a miniaturized and slimmed structure with a thickness of 1 mm while being manufactured at low costs, and an active optical cable assembly using the same.

BACKGROUND ART

An optical engine is typically used to transmit data at high speed. The optical engine includes hardware units for converting an electrical signal to an optical signal, transmitting the optical signal, receiving the optical signal, and converting the optical signal back into an electrical signal. An electrical signal is converted to an optical signal when the electrical signal is used to be modulated in a light source device such as a laser unit. Light from a light source is coupled to a transmission medium such as an optical fiber. After passing through an optical network and reaching its destination through various optical transmission media, the light is coupled to a receiving device such as a detector. The detector generates an electrical signal based on the received optical signal for use by a digital processing circuit.

Optical communication systems are often used to transmit data in various systems, such as electrical telecommunication systems and data communication systems. The electrical telecommunication systems often involve the transmission of data over a wide geographical distance ranging from a few miles to thousands of miles. The data communication systems often involve the transmission of data through a data center. Such systems include the transmission of data over distances ranging from a few meters to hundreds of meters. A coupling component that is used to transmit an electrical signal as an optical signal and that transfers the optical signal to an optical transmission medium such as an optical cable is relatively expensive. Because of this cost, optical transmission systems are typically used as the backbone of a network that transmits large amounts of data over long distances.

Meanwhile, current computer platform architecture designs can encompass several different interfaces to connect one device to another. These interfaces provide input/output (I/O) to computing devices and peripheral devices, and can use a variety of protocols and standards to provide I/O. Different interfaces may use different hardware structures to provide interfaces. For example, current computer systems typically have multiple ports with corresponding connection interfaces, which are implemented by physical connectors and plugs at the ends of the cables connecting the devices.

A universal connector type may be provided with a universal serial bus (USB) subsystem having multiple associated USB plug interfaces, DisplayPort, High Definition Multimedia Interface (HDMI), Firewire (as defined in IEEE 1394), or other connector types.

In addition, for transmission of very large-capacity data at a very high speed between two separate devices such as a UHD television (TV) using a set-top box, an electrical and optical input/output interface connector is required.

Furthermore, when a large amount of data needs to be transmitted and received between a board and another board in a UHD television, a miniaturized and slimmed optical interface connector with a thickness of 1 mm is required.

That is, in order to achieve high-speed transmission while satisfying a thin form factor in a TV or the like, the size of an active optical cable (AOC) connector or the size of an optical engine embedded in the AOC should be as thin as 1 mm or less. However, since the conventional AOC is packaged on a printed circuit board (PCB) in a bonding or Chip On Board (COB) form, it is difficult to realize a thin thickness.

AOC, which meets these requirements, is now being offered at a high price, but since such a high price is dominated by additional active alignment costs due to the inaccurate alignment between PCBs, optical elements (photodiode (PD)/vertical-cavity surface-emitting laser (VCSEL) devices), optical components (lenses or mirrors), or optical fibers, it requires a lot of costs to construct and assemble an accurate structure for passive alignment.

In addition, it is required to solve the performance degradation caused by wire-bonding of optical elements (PD/VCSEL) for high-speed interconnection of several tens giga to 100 giga or more.

Korean Patent Application Publication No. 10-2014-0059869 (Patent Document 1) discloses an input/output (I/O) device comprising: an I/O connector including both electric and optical I/O interfaces, wherein the optical I/O interface includes at least one optical lens; at least one optical fiber a first end of which is terminated at the I/O connector and optically coupled to the at least one optical lens; and a transceiver module that converts optical signals to electrical signals and includes at least one lens wherein a second end of the at least one optical fiber is terminated at the transceiver module and wherein the I/O connector and the transceiver module are not in contact with each other.

In the I/O device of Patent Document 1, since optical elements such as an optical engine and driving chips are assembled by using a printed circuit board, automation for achieving high accuracy and productivity is difficult, and miniaturization and slimness are difficult.

Generally, an optical communication module should include: a mechanical device capable of fixing an optical cable for transmitting an optical signal; an optical element for converting an optical signal transmitted via the optical cable into an electrical signal or converting an optical signal for transmission via the optical cable from an electrical signal; and an interface circuit for transmitting and receiving information with respect to the optical element.

In the conventional optical communication module, the optical cable fixing mechanical device, the optical element, and chips for the interface circuit should be disposed separately from each other on a circuit board in a separate process. Therefore, the area occupied on the circuit board is widened, and the manufacturing process is complicated. In addition, since the electrical signal provided by the optical element is provided to an optoelectronic circuit through a conductive strip formed on the circuit board, the electrical signal may be deteriorated.

DISCLOSURE

Technical Problem

Accordingly, the present invention has been made to solve the above problems occurring in the prior art, and it is an object of the present invention to provide a slim connector plug and an active optical cable assembly using the same, in which the alignment between an optical element and a mirror and the alignment between a mirror and an optical fiber can have high accuracy without misalignment even when utilizing a passive alignment technique, by packaging an optical element module without using a substrate and aligning the optical element module on an optical sub-assembly (OSA) wafer including a 45° reflective surface mirror, in a Fan Out Wafer Level Package (FOWLP) manner using a semiconductor manufacturing process.

It is another object of the present invention to provide a slim connector plug and an active optical cable assembly using the same, in which the alignment between an optical element and a mirror and the alignment between a mirror and an optical fiber can be achieved without misalignment even when utilizing a passive alignment technique, by aligning, in a Wafer Level Alignment (WLA) manner, an optical sub-assembly (OSA) wafer on which an optical element module wafer and an optical fiber are mounted.

It is another object of the present invention to provide a slim connector plug capable of matching a plurality of optical elements and optical fibers by a single WLA and achieving high accuracy and productivity, and an active optical cable assembly using the same.

It is another object of the present invention to provide a slim connector plug capable of realizing a slim optical element module by packaging an optical element and a driving chip without using a substrate in a FOWLP manner using a semiconductor manufacturing process, and an active optical cable assembly using the same.

It is another object of the present invention to a slim connector plug capable of packaging an optical engine with an optical fiber assembly channel as a single chip or a single element by combining a system-in-package (SIP) type optical element module with an optical sub-assembly (OSA) at a wafer level, and an active optical cable assembly using the same.

It is another object of the present invention to provide a slim connector plug in which an optical element is mounted on an optical element module in the form of a flip chip so that packaging can be performed without wire-bonding, and an active optical cable assembly using the same.

It is another object of the present invention to provide a slim connector plug capable of automating an assembly of an optical fiber in an optical fiber assembly channel of a package in a pick-and-place type, and an active optical cable assembly using the same.

It is another object of the present invention to provide a slim connector plug capable of transmitting and receiving a large amount of data at an ultra-high speed and implementing a miniaturized and slimmed structure with a thickness of 1 mm while being manufactured at low cost, and an active optical cable assembly using the same.

It is another object of the present invention to provide a slim connector plug capable of being physically detachably coupled to a mating port of a terminal and capable of performing electrical I/O interfacing or optical interfacing through an interface provided at the mating port and an active optical cable (AOC) assembly using the same.

It is another object of the present invention to provide a slim connector plug having an external connection terminal made of a solder ball and capable of transmitting a large amount of data at an ultra-high speed between a PCB and another PCB, between a chip and another chip, between a PCB and a chip, and between a PCB and a peripheral device, and an active optical cable (AOC) assembly using the same.

It is another object of the present invention to provide a connector plug that can be packaged in a form of a system-in-package (SiP), a system-on-chip (SoC), and a package-on-package (PoP), as a transponder chip having both an electro-optic conversion function and a photo-electric conversion function, and an active optical cable (AOC) assembly using the same.

Technical Solution

A connector plug according to an embodiment of the present invention includes: an optical sub-assembly (OSA) in which an optical fiber seating groove on which an optical fiber is mounted is formed on one side of the OSA and a reflective surface is formed on an inner end of the optical fiber seating groove; an optical element module having an optical engine stacked on the OSA and generating an optical signal or receiving an optical signal; and an optical component installed on the reflective surface of the OSA and transmitting the optical signal between the optical fiber and the optical engine.

A connector plug according to another embodiment of the present invention includes: an optical element module having an optical engine for generating an optical signal or receiving an optical signal therein; an optical fiber supporter stacked on the optical element module and having an optical fiber seating groove on which the optical fiber is assembled; a support substrate which is laminated on the optical element module and has a reflecting surface at a portion facing a core of the optical fiber; an optical component provided on a reflecting surface of the support substrate and transmitting an optical signal between the optical fiber and the optical engine; and a spacer for filling a space between the support substrate and the optical element module.

An active optical cable (AOC) assembly according to another embodiment of the present invention includes: a connector plug coupled to a mating port of a terminal; and an optical cable in which at least one optical fiber is coupled to an optical fiber assembly channel of the connector plug.

A connector plug according to an embodiment of the present invention can be manufactured by a manufacturing method including the steps of: preparing an optical sub-assembly (OSA) in which an optical fiber seating groove on which an optical fiber is to be mounted is formed on one side of the OSA and a reflective surface is formed at a portion facing a core of the optical fiber mounted in the optical fiber seating groove and opposed to the core; preparing an optical element module having an optical engine for generating an optical signal or receiving an optical signal therein; aligning the optical element module in the OSA such that the optical signal generated from the optical engine of the optical element module is reflected or refracted from the reflective surface of the OSA and received by the core of the optical fiber; and bonding the aligned OSA and the optical element module.

Advantageous Effects

In general, an active optical cable (AOC) connector capable of high-speed transmission of tens giga to 100 giga or more is required to be a compact slimmed optical connector with a thickness of 1 mm, and misalignment should not occur while using passive alignment between PCBs, optical elements (PDs/VCSELs), optical components (lenses or mirrors), and optical fibers to meet reasonable manufacturing costs.

The misalignment occurs mainly between a PCB and an optical element, an optical element and a mirror, an optical element and a lens, and a mirror and an optical fiber.

In the present invention, an optical element module wafer of a System In Package (SIP) type and an optical subassembly (OSA) wafer including a 45° reflective surface mirror are aligned by a wafer level alignment (WLA) manner and thus the alignment between an optical element and a mirror and the alignment between a mirror and an optical fiber can have a high accuracy without misalignment, even if a passive alignment technique is used.

Further, in the present invention, a plurality of optical elements, optical components, and optical fibers can be aligned by a single WLA, and thus high throughput can be achieved.

Further, in the present invention, an optical element and a driving chip are packaged without using a substrate in a Fan Out Wafer Level Package (FOWLP) manner using a semiconductor manufacturing process, so that an optical element module can be realized in ultra-compact size of $\frac{1}{16}$ or so of the conventional art.

Also, in the present invention, an optical engine including an optical fiber assembly channel can be packaged at a single time by combining an optical element module of a System In Package (SIP) type and an optical sub-assembly (OSA) in a wafer level.

In the present invention, since an optical element is mounted on an optical element module in the form of a flip chip, packaging can be performed without wire-bonding, thereby reducing a signal resistance coefficient and an electrical resistance coefficient and improving high-frequency characteristics. As a result, performance degradation caused by wire bonding of an optical element (PD/VCSEL) with high-speed interconnection of several tens giga to 100 giga or more can be solved.

In the present invention, an optical fiber assembly channel of a pick-and-place type package may have a structure capable of automating an optical fiber assembly.

In addition, the present invention can provide an active optical cable (AOC) assembly (such as an optical interface connector) capable of transmitting and receiving a large amount of data at a very high speed and being slimmed with a thickness of 1 mm.

In the present invention, a physically detachable coupling can be provided to a mating port of a terminal, and electrical I/O interfacing or optical interfacing can be performed through an interface provided at the mating port.

In addition, in the present invention, an external connection terminal made of a solder ball is provided and ultrahigh-speed and high-capacity data transfer can be performed between a PCB and another PCB, between a chip and another chip, between a PCB and a chip, and between a PCB and a peripheral device.

A connector plug according to the present invention can be packaged in a form of a system-in-package (SiP), a system-on-chip (SoC), and a package-on-package (PoP), as a transponder chip having both an electro-optic conversion function and a photo-electric conversion function.

In addition, in the present invention, an active optical cable (AOC) can implement an external connection terminal to meet the data transmission standard such as a mini display port, a standard display port, a mini universal serial bus (USB), a standard USB, a PCI Express (PCIe), IEEE 1394 Firewire, Thunderbolt, lightning, and high-definition multimedia interface (HDMI).

As a result, the HDMI type active optical cable (AOC) according to the present invention can be applied for digital signal encryption transmission between a video reproduction device (such as a set-top box) and a video display device (such as TV) requiring high-bandwidth high-speed data transmission by simultaneously enabling transmission of control signals capable of applying a video and audio copy protection (recording prevention) technology to one cable.

BEST MODE

Figure 1:
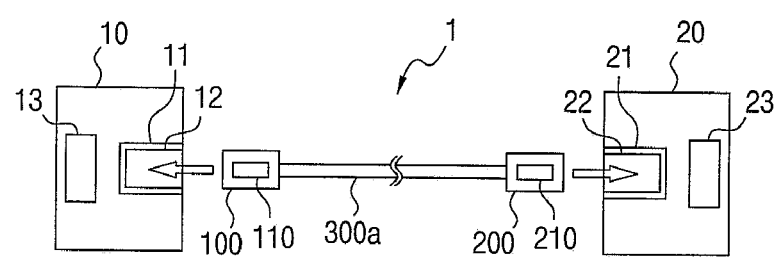
FIG. 1 is a schematic block diagram illustrating an optical communication system constructed using an active optical cable (AOC) assembly according to the present invention.

Hereinafter, embodiments of the present invention will be described in detail with reference to the accompanying drawings. The sizes and shapes of the components shown in the drawings may be exaggerated for clarity and convenience.

Due to the price of the elements that convert electrical signals to optical signals and vice versa, optical communication systems are typically used as backbones in networks. However, optical communication systems can provide various advantages in computer communications. Computer communications refers to communications ranging from a few centimeters to hundreds of centimeters.

The present invention provides systems applicable to computer communications as well as an optical communication system used for optical communication between a terminal and another terminal which are located at a long distance from each other.

The optical system may use a semiconductor package that connects an optical fiber to an optical engine. An optoelectronic element is a light emitting device or a light receiving device. An example of a light emitting device is a vertically-cavity surface-emitting laser (VCSEL). An example of a light receiving device is a photodiode (PD).

A driving circuit (i.e., a driving chip or optical IC) is used to operate according to an optical element. For example, a photodiode operates with a trans-impedance amplifier to amplify an electrical signal due to a collision of photons on the photodiode. When the optoelectronic element is a light emitting device, the drive circuit is used to drive the light emitting device.

An optical element module package is provided in which an optical element and a driving circuit are placed in a package of a SIP (System In Package) type without using a substrate, and an optical path between the optical element and the outside of the SIP is formed. The elimination of substrate usage enables smaller and cheaper optical transmission systems.

In the present invention, a slim optical element module can be implemented by packaging an optical element and a driving chip by using a fan-out technology of withdrawing input/output (I/O) terminals thereby increasing I/O terminals, that is, a fan-out Wafer Level Package (FOWLP) technology, when a driving circuit (such as a driving chip) operating according to an optoelectronic element is integrated without wire-bonding using a flip chip package technology together with the optoelectronic element, while elements are integrated without using a substrate.

The optical element module is a kind of SIP technology, and it is compared with the conventional package by packaging using an encapsulation material such as epoxy mold compound (EMC) for fixing a chip (such as a die) without using a substrate such as a PCB, so that it can be downsized and slimmed to a level of about $1/16$, and the cost can be reduced.

In addition, various alignment techniques are used to align optoelectronic elements (such as optical elements) with optical fibers inserted in a semiconductor package. In the optical element module, a manufacturing process is performed using a semiconductor process on a wafer-by-wafer basis, an optical sub-assembly (OSA) on which an optical fiber is mounted is also processed at a wafer level, optical element module wafers and optical sub-assembly (OSA) wafers in which optical element modules are integrated can be aligned and bonded in a wafer level alignment (WLA) manner, and then an optical engine package is obtained as a semiconductor package type so that optical fibers can be fixed by a dicing process of sawing and individually separating the bonded wafers.

Furthermore, as the optical element module wafer and optical sub-assembly (OSA) wafer are aligned and bonded in a wafer level alignment (WLA) manner, the alignment between the optical element and the mirror and the alignment between the mirror and the optical fiber can be done without misalignment even with the use of passive alignment technology without using active alignment.

FIG. 1 is a schematic block diagram illustrating an optical communication system constructed using an active optical cable (AOC) assembly according to the present invention.

The optical communication system 1 enables optical communication by interconnecting first and second terminals 10 and 20 to have first and second connector plugs 100 and 200 at respective ends. An optical cable 300a having optical fibers therein is connected between the second connector plugs 100 and 200.

Here, the first and second terminals 10 and 20 may each be one of a desktop or laptop computer, a notebook, an Ultrabook, a tablet, a netbook, or a number of computing devices not included therein.

In addition to computing devices, the first and second terminals 10 and 20 may include many other types of electronic devices. Other types of electronic devices may include, for example, smartphones, media devices, personal digital assistants (PDAs), ultra mobile personal computers, multimedia devices, memory devices, cameras, voice recorders, I/O devices, a server, a set-top box, a printer, a scanner, a monitor, an entertainment control unit, a portable music player, a digital video recorder, a networking device, a game machine, and a gaming console.

The first and second terminals 10 and 20 are connected to each other through the optical communication system according to the present invention and first and second mating ports 12 and 22 which are physically coupled to the first and second connector plugs 100 and 200 so as to be capable of performing interfacing are installed, in numbers of at least one, in housings 11 and 21 which are provided in the first and second terminals 10 and 20, respectively.

The first and second connector plugs 100 and 200 may support communications via an optical interface. In addition, the first and second connector plugs 100 and 200 may support communications via an electrical interface.

In some exemplary embodiments, the first terminal 10 may include a first server having a plurality of processors, and the second terminal 20 may include a second server having a plurality of processors.

In these embodiments, the first server may be interconnected with the second server by means of the connector plug 100 and the mating port 12. In another embodiment, the first terminal 10 may include a set-top box, the second terminal 20 may include a television (TV), and vice versa. Also, the first and second connector plugs 100 and 200 and the first and second mating ports 12 and 22 described herein may be one of a number of embodiments.

Also, the second terminal 20 may be a peripheral I/O device.

The first and second connector plugs 100 and 200 may be configured to engage with the first and second mating ports 12 and 22 of the first and second terminals 10 and 20, respectively.

The first and second mating ports 12 and 22 may also have one or more optical interface components. In this case, the first mating port 12 may be coupled to an I/O device and may include processing and/or terminal components for transferring optical signals (or optical and electrical signals) between a processor 13 and the port 12. Signal transfer may include generation and conversion to or reception of optical signals and conversion to electrical signals.

The processors 13 and 23 provided in the first and second terminals 10 and 20 may process electrical and/or optical I/O signals, and one or more of the processors 13 and 23 may be used. The processors 13 and 23 may be a microprocessor, a programmable logic device or array, a microcontroller, a signal processor, or a combination comprising some or all of these.

The first and second connector plugs 100 and 200 may include first and second optical engines 110 and 210 in the connector plugs and the first and second connector plugs 100 and 200 may be referred to as active optical connectors or active optical receptacles and active optical plugs.

Generally, such an active optical connector can be configured to provide a physical connection interface to the mating connector and optical assembly. The optical assembly may also be referred to as a "sub-assembly." The assembly may refer to a finished product or a completed system or subsystem of an article of manufacture, but the sub-assembly may generally be combined with other components or other subassemblies to complete the sub-assembly. However, subassemblies are not distinguished from "assemblies," herein, and references to assemblies can be referred to as subassemblies.

The first and second optical engines 110 and 210 may include any devices configured to generate and/or receive and process an optical signal according to various tasks.

In an embodiment, the first and second optical engines 110 and 210 may include at least one of a laser diode for generating an optical signal, a light integrated circuit (IC) for controlling the optical interfacing of the first and second connector plugs 100 and 200, and a photodiode for receiving an optical signal. In some embodiments, the optical IC may be configured to control the laser diode and the photodiode, drive the laser diode, and/or amplify the optical signal from the photodiode. In another embodiment, the laser diode comprises a vertical-cavity surface-emitting laser (VCSEL).

In one embodiment, the first and second optical engines 110 and 210 may be configured to process optical signals according to one or more communication protocols or in correspondence thereto. In embodiments where the first and second connector plugs 100 and 200 are configured to transmit optical and electrical signals, optical and electrical interfaces may be required to operate in accordance with the same protocol.

Depending on whether the first and second optical engines 110 and 210 process signals in accordance with the protocol of the electrical I/O interface, or process signals in accordance with another protocol or standard, the first and second optical engines 110 and 210 may be configured or programmed for the intended protocol in a particular connector, or various optical engines may be configured for the various protocols.

In one embodiment, a photodiode, or a component having a photodiode circuit, can be considered as a photonic terminal component because the photodiode converts an optical signal into an electrical signal. The laser diode may be configured to convert an electrical signal to an optical signal. The optical IC may be configured to drive the laser diode based on a signal to be optically transmitted by driving the laser diode to an appropriate voltage to generate an output for generating the optical signal. The optical IC may be configured to amplify the signal from the photodiode. The optical IC may be configured to receive, interpret, and process an electrical signal generated by the photodiode.

In an embodiment of the present invention, an I/O complex (not shown) may be provided to transmit an optical signal (or an optical signal and an electrical signal) between processors 13 and 23 and mating ports 12 and 22. The I/O complex can accommodate at least one I/O wiring which is constructed to control at least one I/O link which allows the processor 13 and 23 to communicate with the first and second terminals 10 and 20 via the first and second optical engines 110 and 210 of the first and second connector plugs 100 and 200. The I/O wiring may be configured to provide the ability to transmit one or more types of data packets of a communication protocol.

Various communication protocols or standards may be used in embodiments of the present invention. The communications protocols meet the data transmission standard such as a mini display port, a standard display port, a mini universal serial bus (USB), a standard USB, a PCI Express (PCIe), an IEEE 1394 Firewire, a Thunderbolt, a lightning, and a High Definition Multimedia Interface (HDMI), but the present invention is not limited thereto.

Each different standard may have a different configuration or pinout for an electrical contact assembly. In addition, the size, shape and configuration of the connector may be subject to a standard that includes tolerances for mating of the mating connectors. Thus, the layout of connectors for integrating optical I/O assemblies may differ in various standards.

Physically detachable coupling may be made between the first and second connector plugs 100 and 200 and the mating ports 12 and 22 of the first and second terminals 10 and 20, and electrical I/O interfacing or optical interfacing may be accomplished via an interface provided at the mating ports 12 and 22.

In addition, in another embodiment described later, the first and second connector plugs 100 and 200 are not physically detachably coupled with the mating ports 12 and 22, but an external connection terminal made of a solder ball may be fixedly coupled to the main board including the processors 13 and 23. As a result, as shown in FIG. 1, the active optical cable (AOC) assembly of the present invention, in which the first and second connector plugs 100 and 200 are connected to both ends of the optical cable 300a, can be applied when the high-speed and large-capacity data transmission is needed by interconnecting each other between a PCB and another PCB, between a chip and another chip, between a chip and a PCB, between a board and a peripheral device, for example, between a terminal body and a peripheral I/O device.

In the optical communication system 1 according to an embodiment of the present invention, when the optical communication is performed between the first and second terminals 10 and 20, the first and second connector plugs 100 and 200 provided at respective ends can be configured in the same manner. Accordingly, the first connector plug 100, that is, the active optical cable (AOC) assembly, to be coupled with the first terminal 100 will be described in detail below.

Figure 2:
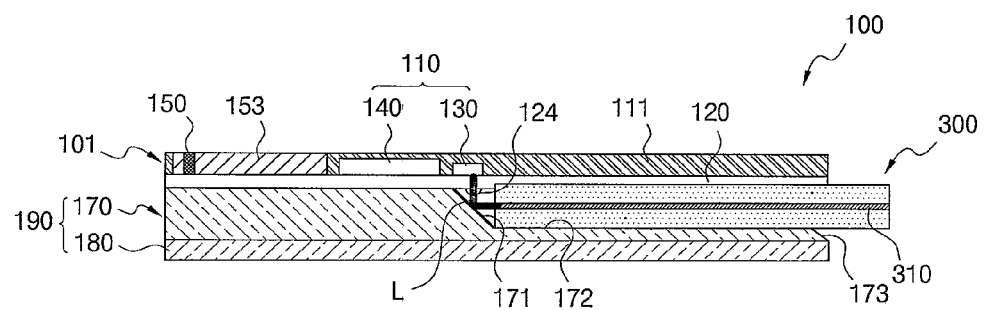
FIG. 2 is a longitudinal cross-sectional view of an active optical cable (AOC) assembly according to a first embodiment of the present invention.
Figure 3A:
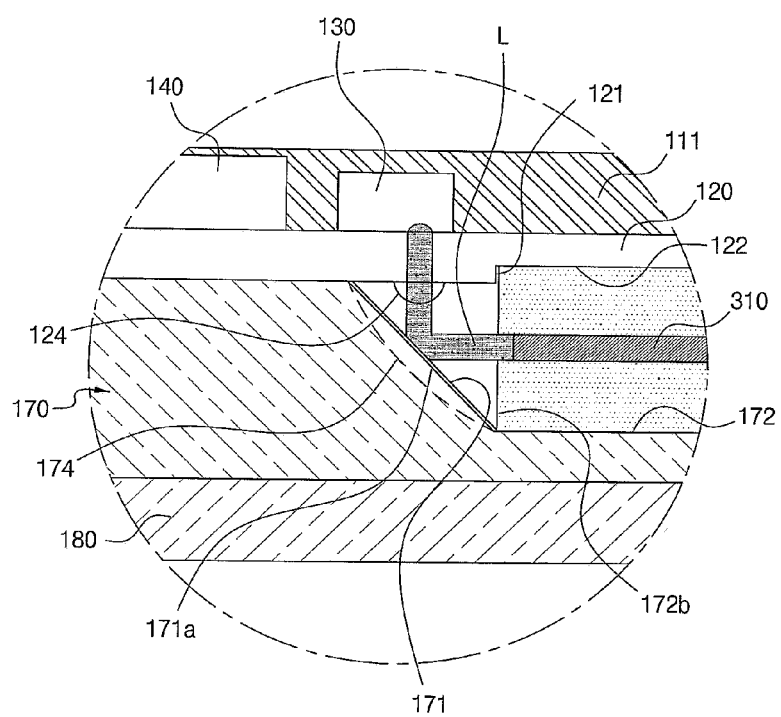
FIGS. 3A and 3B are enlarged views showing an optical interface portion and an optical fiber lead-in portion of the active optical cable (AOC) assembly according to the first embodiment of the present invention shown in FIG. 2.
Figure 3B:
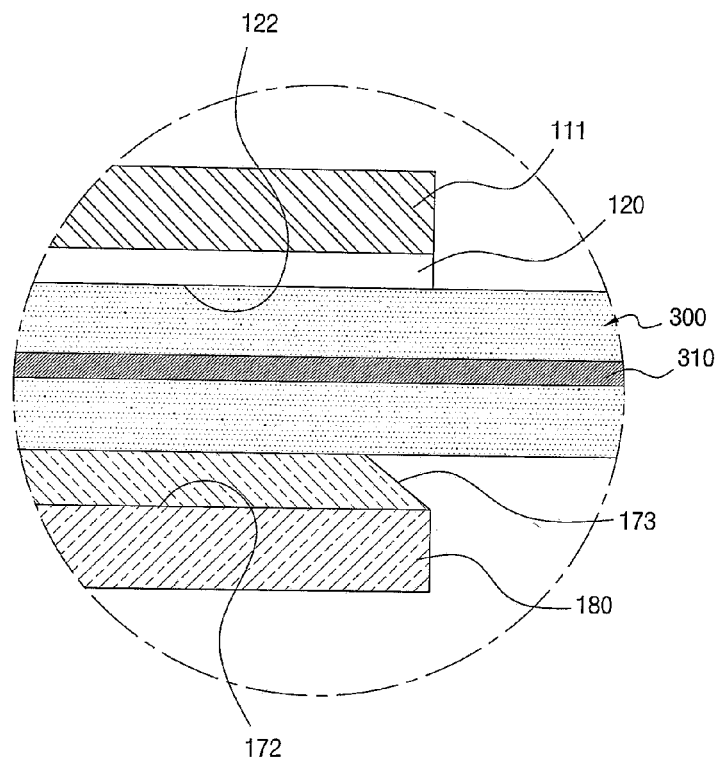

FIG. 2 is a longitudinal cross-sectional view of an active optical cable (AOC) assembly according to a first embodiment of the present invention. FIGS. 3A and 3B are enlarged views showing an optical interface portion and an optical fiber lead-in portion of the active optical cable (AOC) assembly according to the first embodiment of the present invention shown in FIG. 2. FIG. 4 is an enlarged view of a portion of the right side of the active optical cable (AOC) assembly according to the first embodiment of the present invention shown in FIG. 2 in which an optical fiber is inserted. FIG. 5 is an exploded view of the active optical cable (AOC) assembly according to the first embodiment of the present invention shown in FIG. 2.

Referring to FIGS. 2 to 5, the active optical cable (AOC) assembly according to the first embodiment of the present invention includes a connector plug 100 and an optical cable 300a coupled thereto.

The connector plug 100 according to the first embodiment of the present invention includes: an optical element module 101 manufactured in a System In Package (SIP) form to include an optical engine 110; and an optical sub-assembly 190 on which an optical fiber is mounted. A plurality of optical fibers 300 connected to an optical fiber cable 300a are inserted into optical fiber insertion channels 305 formed in the optical element module 101 and the optical sub-assembly (OSA) 190.

Figure 7A:
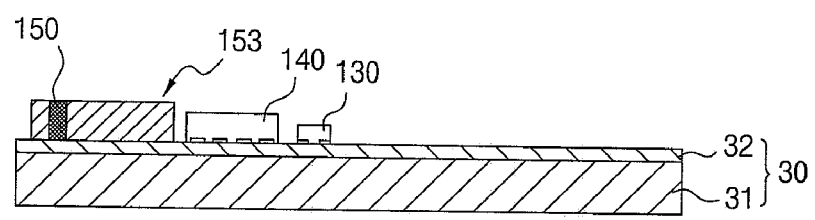
FIGS. 7A to 7G are cross-sectional views illustrating a method of fabricating an optical element module of the active optical cable (AOC) assembly according to the first embodiment of the present invention by a Fan Out Wafer Level Package (FOWLP) manner.
Figure 7B:
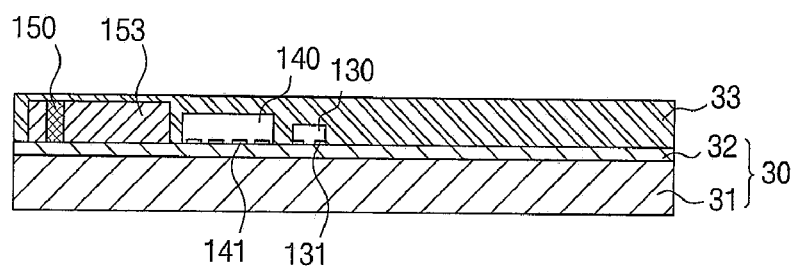
Figure 7C:
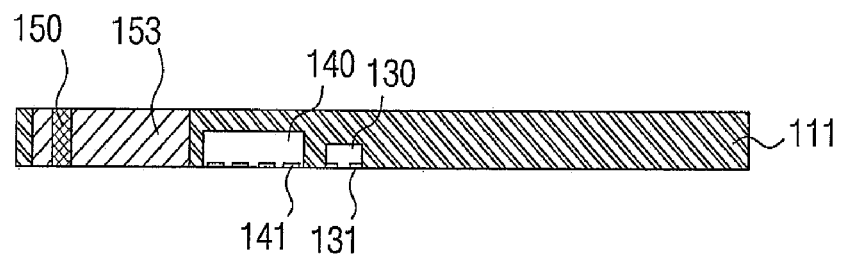
Figure 7D:
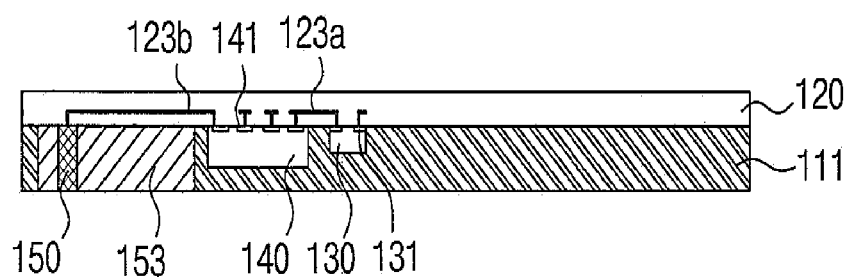
Figure 7E:
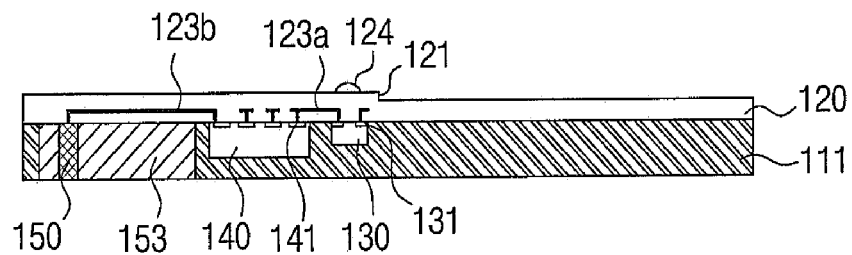
Figure 7F:
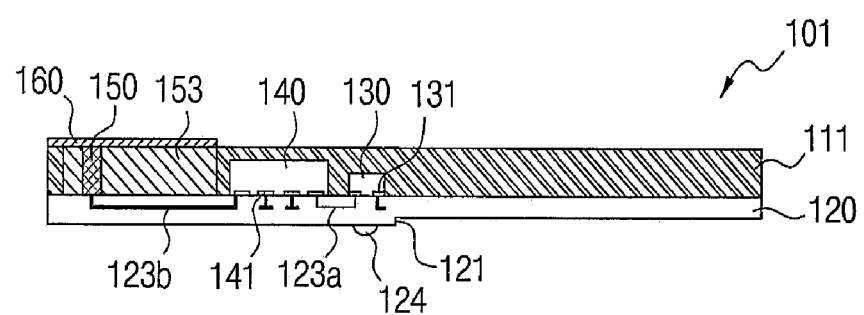
Figure 7G:
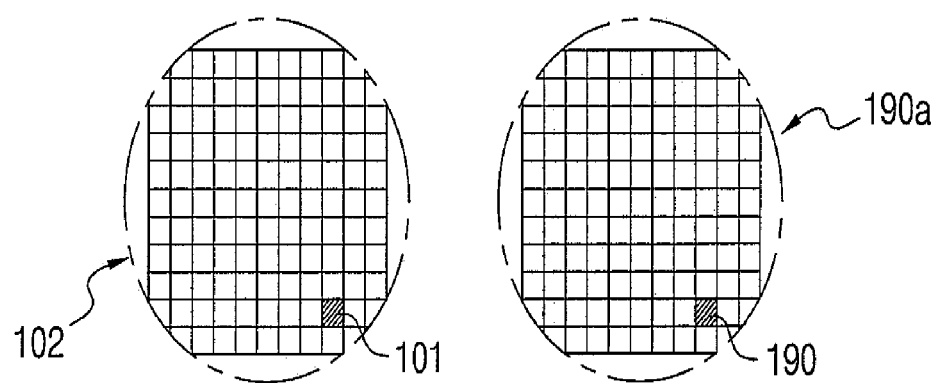

As shown in FIG. 7G, the connector plug 100 according to an embodiment of the present invention is manufactured into an individual connector plugs 100, by passive-aligning and integrating an SIP wafer 102 in which the optical element module 101 is manufactured in the form of a wafer and an OSA wafer 190a in which the OSA 190 is manufactured in the form of a wafer in a wafer level alignment (WLA) manner, followed by dicing the same.

As will be described later, the optical element module 101 according to an embodiment of the present invention may be manufactured in a slim form by packaging an optical element and a driving chip without using a substrate in a Fan Out Wafer Level Package (FOWLP) manner using a semiconductor manufacturing process.

The optical element module 101 may include an optical engine 110 (see FIG. 1) to provide an optical interface, and an external connection terminal 160, which satisfies one of various data transmission standard standards, may be formed in the form of a conductive strip on an outer side surface of the optical element module 101.

In this case, the external connection terminal 160 may be variously modified in the form of a conductive strip according to the data transmission standard, or may be formed in the form of solder balls or metal bumps.

The optical element module 101 may include an active optical engine 110 configured to actively generate and/or receive and process optical signals. The optical engine 110 may include an optical element 130 for generating an optical signal or receiving an optical signal, and an optical IC 140 for controlling an optical interface by controlling the optical element. In addition, the optical device module 101 may further include a processor (not shown), an encoder and/or a decoder, a passive device such as R, L, and C, or a power related IC chip, which are required for signal processing in addition to the optical IC 140 as necessary.

The optical element 130 may include, for example, a laser diode for generating an optical signal and/or a photodiode for receiving an optical signal. In another embodiment, the optical IC 140 may be configured to control the laser diode and the photodiode. In another embodiment, the optical IC 140 may be configured to drive the laser diode and amplify an optical signal from the photodiode. In another embodiment, the laser diode may include a VCSEL.

The optical element module 101 does not use a substrate, but integrates various components, for example, the optical element 130 and the optical IC 140 in the form of a flip chip, for example, and is molded by using an epoxy mold compound (EMC) to form the mold body 111. As a result, the mold body 111 serves to safely protect the optical engine 110, which is packaged after being integrated, from impact.

As shown in FIG. 7F, in the optical element module 101, a conductive vertical via 150 that is used for electrical interconnection with the external connection terminal 160 disposed on an outer surface of the optical element module 101, is arranged in the vertical direction with respect to the mold body 111.

The optical element module 101 includes the wiring layer 120 for protecting and simultaneously for electrically connecting various components constituting the optical engine 110 on the lower surface thereof, for example, the connection pads 131 and 141 of the optical element 130 and the optical IC 140.

In this case, the optical element 130 employs an element in which two connection pads 131 made up of an anode and a cathode are disposed on the same surface as a portion through which light enters and exits.

The wiring layer 120 is provided with a conductive wiring pattern 123a for connecting the optical element 130 and the connection pads 131 and 141 disposed on the lower surface of the optical IC 140, and a conductive wiring pattern 123b interconnecting the optical IC 140 and the conductive vertical via 150 in which the conductive wiring pattern 123a and the conductive wiring pattern 123b are buried in the wiring layer 120. As a result, packaging can be achieved without wire-bonding.

The wiring layer 120 is made of the same material as a dielectric layer or a passivation layer, for example, polyimide, poly (methyl methacrylate) (PMMA), benzocyclobutene (BCB), silicon oxide ($SiO_2$), acrylic, or other polymer-based insulating materials.

Figure 8A:
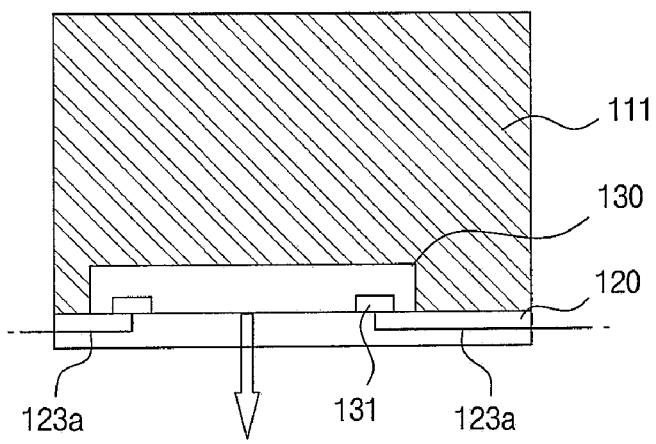
FIGS. 8A to 8C are cross-sectional views showing an exit structure of an optical element (such as a light emitting device) arranged in an optical element module, respectively.

Since the optical element 130 includes a laser diode for generating an optical signal and/or a photodiode for receiving an optical signal, the wiring layer 120 may be made of a transparent material as shown in FIG. 8A such that an optical signal is generated from the laser diode or an optical signal is received by the photodiode.

Figure 8B:
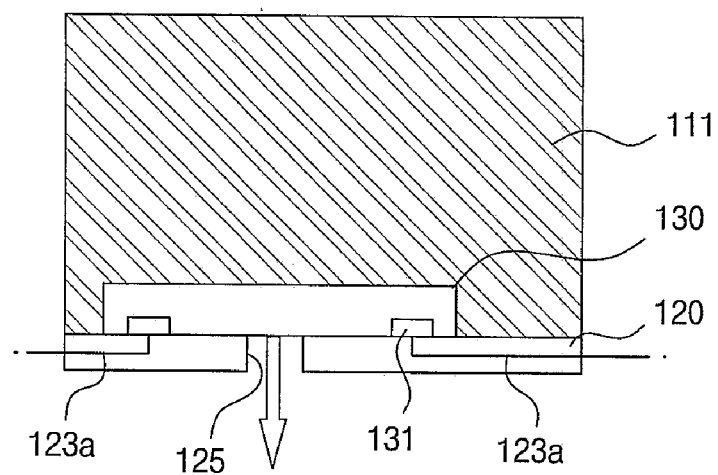
Figure 8C:
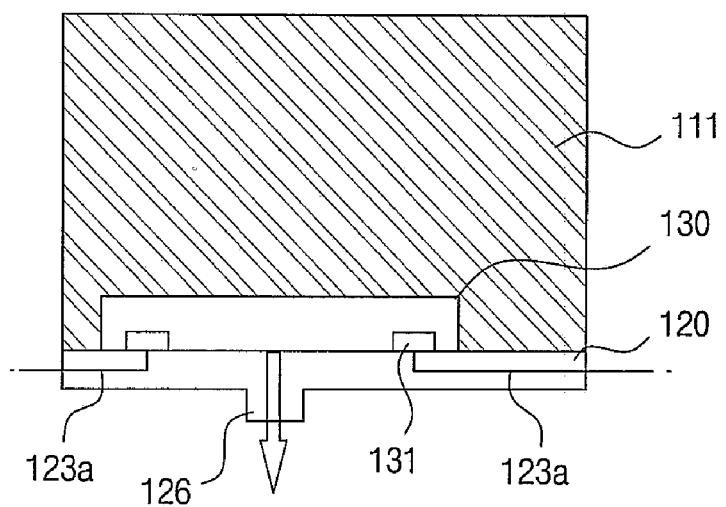

In addition, when the wiring layer 120 is made of an opaque material, a window 125 through which optical signals generated from the optical element 130 can pass is formed as shown in FIG. 8B.

Further, even when the wiring layer 120 is formed of a transparent material, the wiring layer 120 can be provided with an extension protrusion 126 in order to adjust the distance between the optical element 130 and the optical component 171 disposed in the optical sub-assembly (OSA) 190, for example, a mirror or a lens.

In addition, as shown in FIGS. 2 and 3, even when the wiring layer 120 is formed of a transparent material, the wiring layer 120 further includes an optical lens 124 for changing (controlling) the path of the light L generated from the optical element 130.

For example, the optical lens 124 functions as a collimating lens which makes the light L generated from the optical element 130 in a path in near parallel without being dispersed, or a focusing lens that focuses the light L at one point. Thus, the light L may be guided to be incident to the optical component 171 disposed in the optical sub-assembly (OSA) 190, for example, a mirror or a lens.

The optical component 171 is disposed between the optical element 130 and the optical fiber assembled in the optical sub-assembly (OSA) 190 to serve as an optical path shifting member that reflects or refracts an optical signal to shift an optical signal path.

Figure 4A:
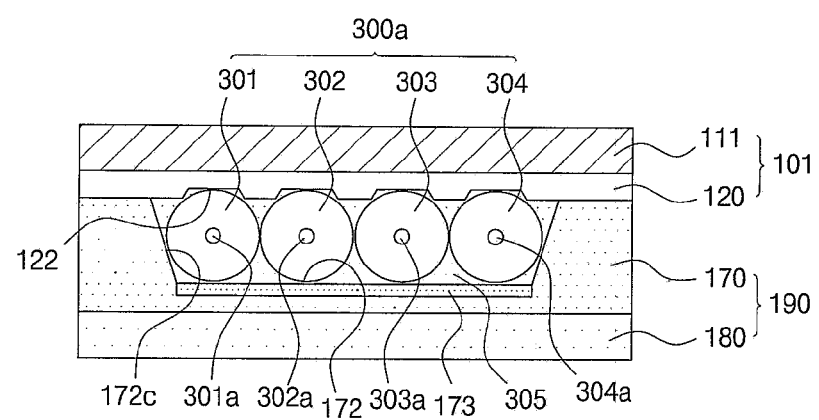
FIGS. 4A to 4C are enlarged views showing various structures of an optical fiber insertion channel in the active optical cable (AOC) assembly according to the first embodiment of the present invention shown in FIG. 2.
Figure 5:
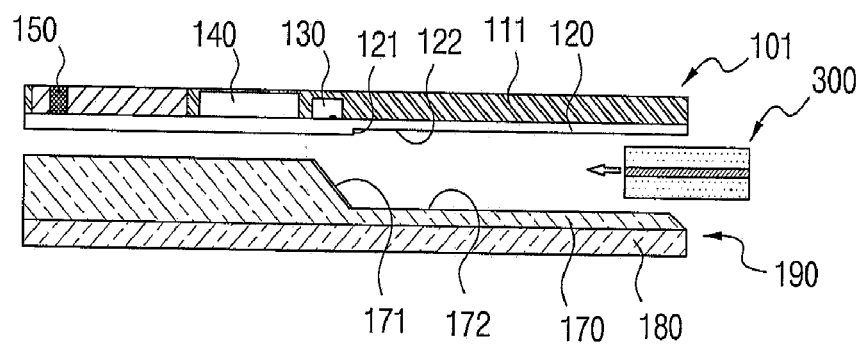
FIG. 5 is an exploded view of the active optical cable (AOC) assembly according to the first embodiment of the present invention shown in FIG. 2.

Further, as shown in FIG. 4A, the wiring layer 120 serves as a stopper in order to make an inner end 121 of a cover recess 122 to be described later limit the insertion depth of the optical fiber 300 to a predetermined depth, when the optical element module 101 and the optical sub-assembly (OSA) 190 are combined with each other to thereby form an optical fiber insertion channel 301 that accommodate a plurality of optical fibers 300.

Hereinafter, a method of manufacturing the optical element module 101 according to the present invention will be described with reference to FIGS. 7A to 7F.

First, as shown in FIG. 7A, various chip-shaped components to be integrated into the optical element module 101 are attached to a predetermined position of a molding tape 30 in a flip chip process using the molding tape 30 having an adhesive layer (or a release tape) 32 formed on one surface of a molding frame 31.

In this case, the molding tape 30 may be formed in a wafer shape so that the manufacturing process can be performed in a wafer level, as shown in FIG. 7G.

Various components to be integrated in the optical element module 101 are the optical element 130, the optical IC 140, and a via PCB 153 required to form the conductive vertical via 150, and are mounted in a pick-and-place manner. In this case, a processor necessary for signal processing may be included as needed. The component to be mounted determines the mounting direction so that the connection pads of the chip are in contact with the molding tape 30.

The via PCB 153 may form a through hole by penetrating a PCB with a laser or by using a patterning process and an etching process on the PCB, and fill the through hole with a conductive metal to thereby form the conductive vertical via 150. The conductive metal may be formed of a metal such as gold, silver, or copper, but is not limited thereto and may be a conductive metal. In addition, the method of forming the conductive vertical via 150 in the through hole may include filling the through hole with the conductive metal by sputtering, evaporation, or plating, and then planarizing the surface of a substrate, in addition to the method of filling the conductive metal powder.

In this case, the optical element 130 employs an element in which two connection pads 131 made up of an anode and a cathode are disposed on the same surface as a portion through which light enters and exits.

Subsequently, as shown in FIG. 7B, for example, the molding layer 33 is formed on the upper portion of the molding tape 30 with an epoxy mold compound (EMC) and the surface of the molding layer 33 is planarized after curing. Subsequently, the upper surface of the cured mold is processed by chemical mechanical polishing (CMP) to expose the upper ends of the conductive vertical via 150, and then the cured mold and the molding frame 31 are separated, to thus obtain a slim mold body 111, as shown in FIG. 7C.

Subsequently, the wiring layer 120 for inverting the obtained mold body 111, protecting the connection pads 131 and 141 of the exposed optical element 130 and the optical IC 140, and electrically connecting the connection pads 131 and 141 with each other is formed as shown in FIG. 7D.

First, an insulating layer for protecting the exposed optical element 130 and the connection pads 131 and 141 of the optical IC 140 is first formed, and then contact windows for the connection pads 131 and 141 are formed. Subsequently, a conductive metal layer is formed and patterned to form a conductive wiring pattern 123a interconnecting the connection pads 131 and 141 and a conductive wiring pattern 123b interconnecting the optical IC 140 and the conductive vertical via 150.

The wiring patterns 123a and 123b are formed by forming a conductive metal layer by a method such as sputtering or evaporation using a conductive metal such as gold, silver, copper, or aluminum.

Thereafter, an insulating layer covering the conductive wiring patterns 123a and 123b is formed.

The insulation layer is made of polyimide, poly (methyl methacrylate) (PMMA), benzocyclobutene (BCB), silicon oxide ($SiO_2$), acrylic, or other polymer-based insulating materials.

In this case, since the optical element 130 includes a laser diode for generating an optical signal and/or a photodiode for receiving an optical signal, the insulation layer 120 may be made of a transparent material such that an optical signal is generated from the laser diode or an optical signal is received by the photodiode.

Then, when the wiring layer 120 is formed of a transparent material, as shown in FIG. 7E, a collimating lens 124 is formed on the path through which the light generated from the optical element 130 passes, that is, on the surface of the wiring layer 120.

The lens 124 may be formed using an etching mask used to form the wiring layer 120, and may be formed into a collimating lens of a hemispherical shape by performing a reflow process after forming a protrusion corresponding to the lens using polyimide.

Another method of forming the lens 124 includes forming an insulating layer of the wiring layer 120 with silicon oxide ($SiO_2$) to form a hemispherical etching mask made of photoresist (PR) and etching the exposed insulating layer using the hemispherical etching mask to thereby form the lens 124.

Thereafter, when one side of the wiring layer 120 is etched to insert the optical fiber 300 into the optical fiber insertion channel 301, a trapezoidal or trench type cover groove 122 (see FIG. 4A) for fixing the optical fiber 300 seated in the optical fiber seating groove 172 is formed in the number corresponding to the optical fiber insertion channel 301.

In this case, the inner end 121 of the lid groove 122 is configured to provide a stop to set a predetermined distance between the end face of the optical fiber 300 and the 45° reflective surface during assembly of the optical fiber 300.

Subsequently, as illustrated in FIG. 7F, a conductive metal is deposited on the upper portion of the exposed conductive vertical via 150 to form a metal layer, and then patterned to form a plurality of conductive strips satisfying one of the data transmission standards to thus form an external connection terminal 160.

The external connection terminal 160 may be variously modified according to the data transmission standard, or may be formed in the form of solder balls or metal bumps.

In the above embodiment, a method of integrating the via PCB 153 into the optical element module 101 by a flip chip process in order to form the conductive vertical via 150 is provided, but it is also possible to form a conductive vertical via 150 after manufacturing the mold body 111.

That is, the mold body 111 can be formed by forming a through hole through a laser or a patterning process and an etching process, and filling the through hole with a conductive metal or filing the through hole with a conductive metal by sputtering, evaporation, or plating, and then planarizing the mold surface.

The optical element module 101 according to an embodiment of the present invention may be packaged in a slim form by packaging an optical element and a driving chip without using a substrate in a Fan Out Wafer Level Package (FOWLP) manner using a semiconductor manufacturing process.

Meanwhile, in an embodiment of the present invention, the optical element module 101 is coupled to the upper portion of the optical sub-assembly (OSA) 190 by using the optical element module 101 as a cover for fixing the plurality of optical fibers 300.

Accordingly, as shown in FIG. 4A, the optical fiber insertion channel 305 is formed in the wiring layer 120 of the optical element module 101 in combination with the optical fiber seating groove 172 formed on the optical sub-assembly (OSA) 190, to thereby form the cover groove 122 for fixing the optical fibers 301 to 304 seated in the optical fiber seating groove 172 of the optical sub-assembly (OSA) 190 in the number corresponding to the optical fibers 301 to 304.

The cover groove 122 may have a structure in which the optical fiber 300 placed in the optical fiber seating groove 172 is contacted and fixed at three points in the upper portion. For this purpose, the cover groove 122 may be formed in the form of a trench-type groove having a shallow depth so that the uppermost end of the optical fiber 300 and both sides of the upper portion contact.

However, the cover recess 122 formed at one side of the wiring layer 120 of the optical element module 101 to fix the optical fiber 300 seated in the optical fiber seating groove 172 is not essential but may be omitted. That is, one side of the wiring layer 120 of the optical element module 101 corresponding to the optical fiber seating groove 172 may be formed of a flat cover, and may be in line contact with the optical fiber 300 seated in the optical fiber seating groove 172.

In addition, the optical element 130 disposed in the mold body 111 of the optical element module 101 is also disposed in the transverse direction in correspondence to the plurality of optical fibers 301 to 304 inserted into the optical fiber insertion channels 305.

Figure 4B:
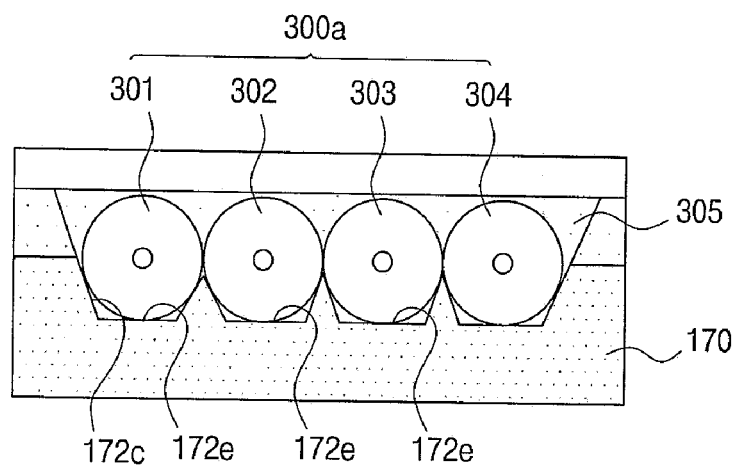
Figure 4C:
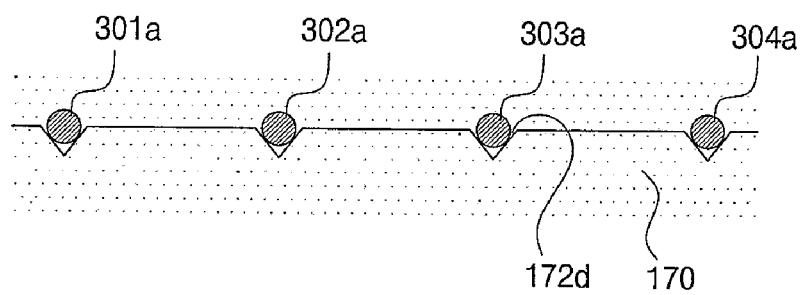
Figure 4D:
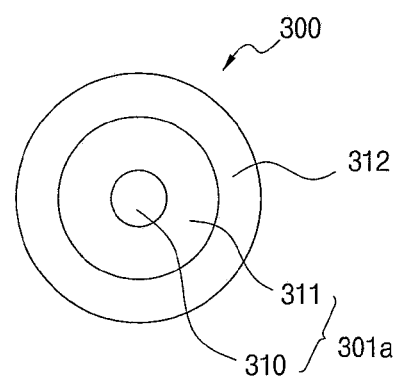
FIG. 4D is an enlarged cross-sectional view of an optical fiber.

As shown in FIG. 4D, the optical fiber 300 includes a clad 311 made of a material having a lower refractive index than a core 310 having a high refractive index and a coating layer 312 serving as a protective layer in which the clad 311 and the coating layer 312 have a structure formed sequentially. The optical fiber 300 uses the difference in refractive index between the core 310 and the clad 311 to use the phenomenon of propagating while light incident on the core 310 repeats total reflection at the interface between the core 310 and the clad 311.

In this case, the optical fiber is largely divided into a glass optical fiber (GOF) and a plastic optical fiber (POF). The plastic optical fiber (POF) is relatively large in diameter compared to the glass optical fiber (GOF), but it is easy to handle the plastic optical fiber (POF) because of the large cross-sectional area of the core through which light propagates.

In the plastic optical fiber (POF), a core 310 is made of an acrylic resin such as polymethyl methacrylate (PMMA), a polycarbonate resin, polystyrene or the like, for example, and a clad 311 is made of, for example, Fluorinated PMMA (F-PMMA), a fluorine resin or a silicone resin, and a coating layer 312 may be made of, for example, PE. As a plastic optical fiber, for example, an optical fiber composed of a Fluorinated PMMA (F-PMMA) clad in a polymethyl methacrylate (PMMA) core may be used.

Figure 6A:
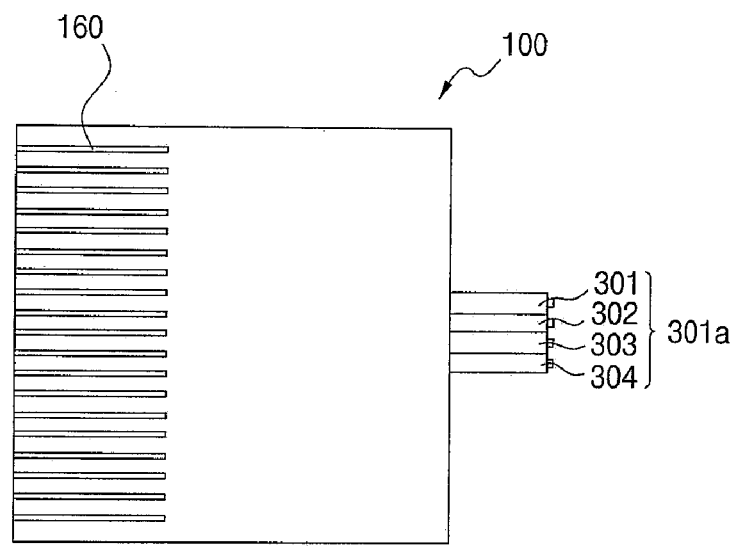
FIGS. 6A to 6D are a plan view, a right side view, and a perspective view of an application and a cross-sectional view of a modified example in which an external connection terminal of the active optical cable (AOC) assembly according to the first embodiment of the present invention is implemented in a form of supporting a high-definition multimedia interface.

When a plurality of optical fibers 301 to 304 are combined to form one optical cable 300a as shown in FIGS. 4A, 4B, and 6A to increase the overall bandwidth without using the optical fiber as a single wire, adjacent cladding layers 312 of the plurality of optical fibers 301 to 304 may be fabricated to be bonded together to form a single body.

In the case of the above-mentioned plastic optical fiber (POF), the diameter of each of the optical fibers 301 to 304 is 400 µm which is commercially available according to the development of the technology, and thus it can be applied to the present invention.

In the glass optical fiber (GOF), both the core 310 and the clad 311 are made of silica glass or multicomponent glass having different refractive indices, and the coating layer 312 made of resin is formed on the outer circumference thereof.

The glass optical fiber (GOF) can be implemented in both a single mode and a multi-mode, and the diameters of the core 310 and the clad 311 are 50/125 µm (in the multi-mode) or 10/125 µm (in the single mode), respectively, and has the advantage that can be made in a small diameter compared to the plastic optical fiber (POF).

In the case of a glass optical fiber (GOF), a plurality of optical fibers 301a, 302a, 303a, and 304a made of only the core 310 and the clad 311 by peeling the coating layer 312 from the portion inserted into the optical fiber insertion channel 305 of the connector plug 100, may be respectively accommodated in the plurality of optical fiber seating grooves 172d formed in a V-groove shape on the support substrate 170, as shown in FIG. 4C.

In addition, in the case of the glass optical fiber (GOF), the coating layers 312 of the plurality of optical fibers 301 to 304 are manufactured to be bonded to each other to form a single body as one optical cable 300a. The plurality of optical fibers 301 to 304 may be inserted into the optical fiber insertion channel 305 of the connector plug 100, in the state where the coating layer 312 is formed in the outer periphery, as shown in FIGS. 4A, 4B, and 6A.

In this case, the diameter of each of the plurality of optical fibers 301 to 304 can be applied to 400 µm or so, and even if using the optical fibers 301 to 304 of the diameter of 400 µm or so, the overall thickness of the connector plug 100 can be realized as slim as 1 mm or so.

When the optical fibers 301 to 304 are inserted into the optical fiber insertion channel 305 of the connector plug 100 in a state where the coating layer 312 is formed on the outer circumference, the optical fiber seating grooves 172 may be formed as shown in FIGS. 4A and 4B.

First, the optical fiber insertion channel 305 shown in FIG. 4A is provided with one optical fiber seating groove 172 that can accommodate a plurality of optical fibers 301 to 304 attached to the support substrate 170 as a single body as an accommodating groove.

In this case, the single optical fiber seating groove 172 formed in the support substrate 170 of the optical sub-assembly (OSA) 190 has the width capable of accommodating substantially the whole of the plurality of optical fibers 301 to 304 and the depth capable of exposing some of the upper ends of the plurality of optical fibers 301 to 304. The optical fiber seating groove 172 is a trench type recess structure in which both side walls 172c have an inclined surface, in which both the side walls 172c have a slope which is in contact with side surfaces of the optical fibers 301 and 304 disposed outside the plurality of optical fibers 301 to 304.

The optical fiber insertion channel 305 shown in FIG. 4B has a plurality of trench type grooves 172e having cross-sections in which a plurality of optical fibers 301 to 304 may be accommodated, respectively, on an upper side of the support substrate 170.

The plurality of optical fibers 301 to 304 coupled to the plurality of optical fiber seating grooves 172e each include a clad and a coating layer coated on the outer circumference of the core, in which the coating layers of adjacent optical fibers have a form separated from each other.

In this case, each of the plurality of optical fiber seating grooves 172e formed in the support substrate 170 has an inclined surface on which both side walls 172c may be in contact with the side surfaces of the plurality of optical fibers 301 to 304, and thus has a trench-type groove structure for contacting and fixing the optical fibers 301 to 304 seated at the optical fiber seating grooves 172e at three points of the lowermost end and both sides.

The shape of the optical fiber seating groove 172e is not limited to this and can be changed into another shape.

The optical sub-assembly (OSA) 190 is made of silicon (Si), glass, or plastic, and may include the support substrate 170 having a plurality of optical fiber seating grooves 172 on which the optical fiber 300 is seated; and a strength reinforcing layer 180 to be laminated on the lower portion of the support substrate 170 to reinforce the strength.

In this case, the strength reinforcing layer 180 may be formed by using, for example, an epoxy resin or the like as a thin film.

In the support substrate 170, a reflective surface is formed on a portion facing the optical element 130, that is, the front surface of the plurality of optical fiber seating groove 172, and when the light L generated from the optical element 130 is incident perpendicularly to an optical sub-assembly (OSA) 190, an optical component 171 is formed in the support substrate 170, to change a path so that the incident light L enters the core 310 of the optical fiber 300 disposed at right angles.

As the optical component 171, for example, a 45° reflective mirror having a mirror formed on a 45° reflective surface or a concave mirror 174 having a 45° reflective surface in a concave shape may be used. The concave mirror 174 plays a role of changing a path to collect incident light L generated from the optical device 130 and to enter the core of the optical fiber 300. The mirror may be formed by depositing, for example, a metal layer made of metal such as Au, Al, Cu, or Pt to a thickness of 100 to 200 nm on a reflective surface.

The support substrate 170 may simultaneously form a 45° reflective mirror and a V-groove.

A first method is to make an etching rate difference between the (110) plane and the (111) plane of the Si substrate (wafer) and then to etch at 45° to the (110) plane. In this method, since the etching surfaces are all 45° (110 planes), the mirror surface and the wall surface of the V-groove become 45°. One mask pattern can be used to create reflective surfaces and V-grooves at a time. Thereafter, selectively depositing metal only on the reflective surface completes a 45° reflective mirror.

The first method will be described in detail by step. First, a mask is aligned on the Si wafer (substrate) in the (110) direction to form a photoresist (PR) pattern to be used as an etching mask.

Subsequently, when anisotropic etching is performed on the Si wafer (substrate) on which the etching mask is formed using a TMAH-Triton solution as an etching solution, the 45° reflective surface and the V-groove may be formed together.

Subsequently, the metal is selectively deposited only on the reflective surface, and the backside of the Si wafer is ground to make the support substrate 170 to a desired thickness.

Finally, an epoxy resin is deposited on the back surface of the support substrate 170 as a material for preventing cracking of the Si substrate to form the strength reinforcing layer 180.

In a second method of forming the support substrate 170, the Si wafer (substrate) is etched using a KOH solution as an etching solution to form a Si V-groove (V-groove) in the (111) direction.

Subsequently, the wall at the end of the V-groove is ground by a sawing machine having a 45° blade to form a 45° reflecting surface, and the reflecting surface is etched to improve roughness or to form a silicon oxide film and then peel off the silicon oxide film to thereby improve roughness.

Thereafter, metal is selectively deposited on the reflective surface, and the backside of the Si wafer is ground to make the support substrate 170 to a desired thickness.

In a preferred embodiment, the optical component 171 can be configured to focus the light received from the optical fiber 300 onto the optical element 130 (e.g., the photodiode) of the optical engine 110, and to focus the light L from the optical element 130 (e.g., the laser diode) of the optical engine 110 to the core 310 of the optical fiber 300.

The connector plug 100 may be configured to support one or more optical channels. In an embodiment having a plurality of optical channels, the connector plug 100 may include an optical component 171 for transmission and reception and a corresponding transmission/reception component of the optical engine 110.

Hereinafter, an optical alignment method of an optical element module wafer 102 and an optical sub-assembly (OSA) wafer 190a will be described with reference to FIG. 7G.

In the present invention, as shown in FIG. 7G, the optical element module wafer 102 and the optical sub-assembly (OSA) wafer 190a are prepared.

In the optical element module wafer 102 and the optical sub-assembly (OSA) wafer 190a, alignment markers are formed in advance at edges of each active region when the manufacturing process is performed at the wafer level. Also, the alignment markers may be placed at four corners of the wafer.

The method of aligning the optical element module wafer and the OSA wafer using an alignment markers can be one selected from, for example, a first method using an optical microscope in the case of a transparent substrate, a second method of forming a through hole in one of the wafers to be aligned and thereby aligning with another wafer, a third method of disposing infrared (IR) light and aligning alignment markers on the opposite side of a transmission electron microscope (TEM) in the case of a Si wafer transparent to IR light, a fourth method of aligning the alignment markers with an optical microscope by placing an alignment marker on the front of one wafer and placing another alignment marker on the back of another wafer, a fifth method of placing alignment markers in front of two wafers to be aligned, placing two pairs of microscopes between the wafers, and aligning the alignment markers, and a sixth method (such as 3D Align Methods) for aligning alignment markers using two microscope sets and a modified wafer table.

The optical alignment method using the alignment markers can be applied when the optical element module 101 and the optical sub-assembly (OSA) 190 are manufactured into the optical element module wafer 102 and the optical sub-assembly (OSA) wafer 190a, respectively, at the wafer level.

However, when the sizes of the optical element module 101 and the optical sub-assembly (OSA) 190 are not the same, alignment may not be performed at the wafer level.

When the optical element module 101 and the optical sub-assembly (OSA) 190 do not have the same size, the optical element module 101 and the optical sub-assembly (OSA) 190 may be aligned using a guide pattern instead of the optical alignment method using the alignment marker. Of course, even when the sizes of the optical element module 101 and the optical sub-assembly (OSA) 190 are the same, the alignment method using the guide pattern may be applied.

That is, the alignment protrusion may be formed in one of the optical element module wafer 102 and the optical sub-assembly (OSA) wafer 190a, and the alignment recess may be formed in the other one of the optical element module wafer 102 and the optical sub-assembly (OSA) wafer 190a, in which the alignment protrusion is matched and coupled to the alignment recess.

Figure 11A:
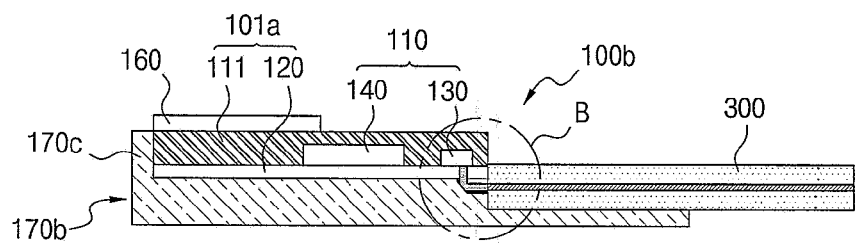
FIGS. 11A and 11B are a longitudinal enlarged view of an active optical cable (AOC) assembly according to a fourth embodiment of the present invention and an enlarged view of a portion B of FIG. 11A, respectively.

First, when the optical element module 101 is smaller than the optical sub-assembly (OSA) 190 as in a fourth embodiment shown in FIG. 11A to be described later, an extension portion 170c serving as a stopper or an alignment guide may protrude from one side of the support substrate 170b and the optical element module 101a may be mounted on the support substrate 170b in a pick-and-place manner.

Figure 9A:
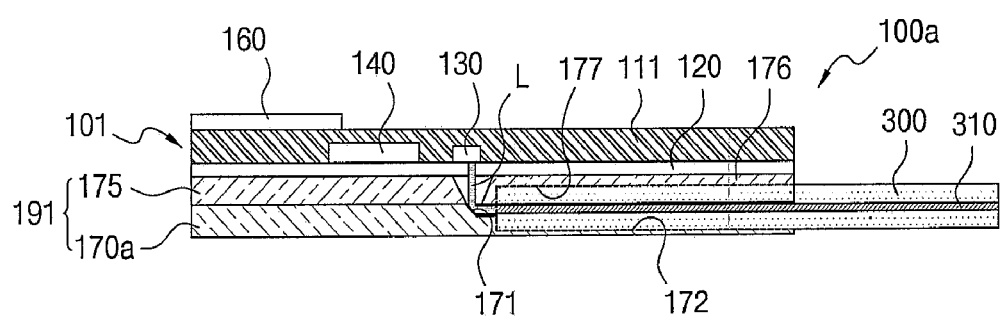
FIGS. 9A to 9D are a longitudinal cross-sectional view of an active optical cable (AOC) assembly according to a second embodiment of the present invention, an inverted state view of FIG. 9A, an enlarged view of a portion A of FIG. 9B, and a plan view of FIG. 9B, respectively.
Figure 9B:
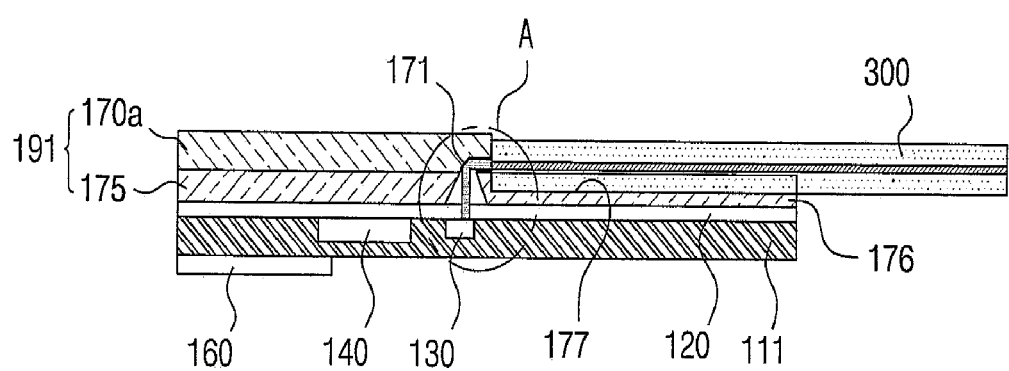
Figure 9C:
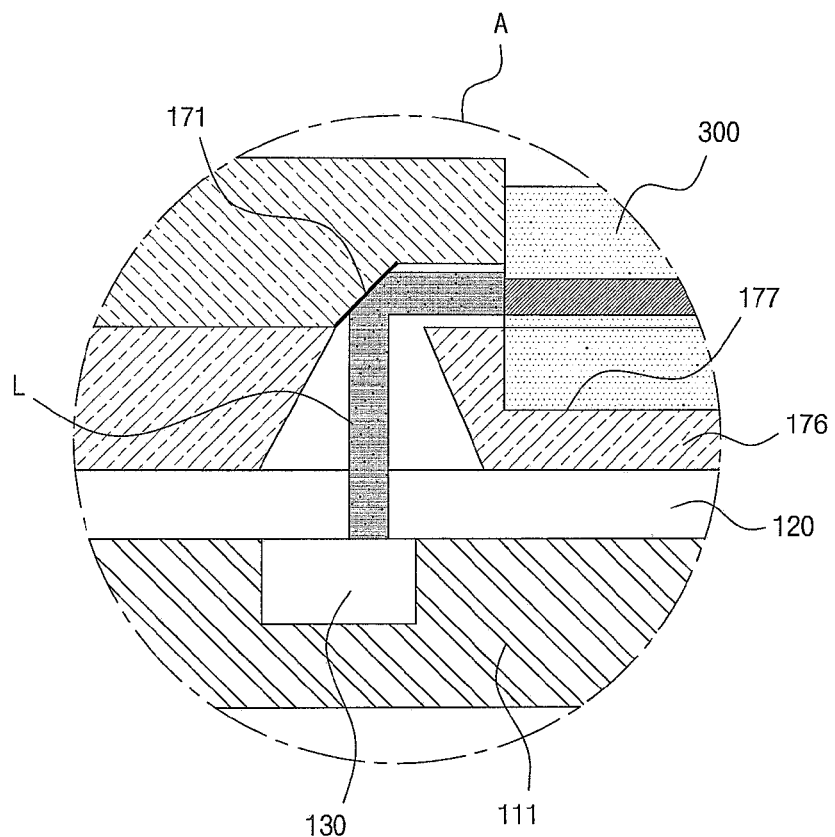
Figure 10A:
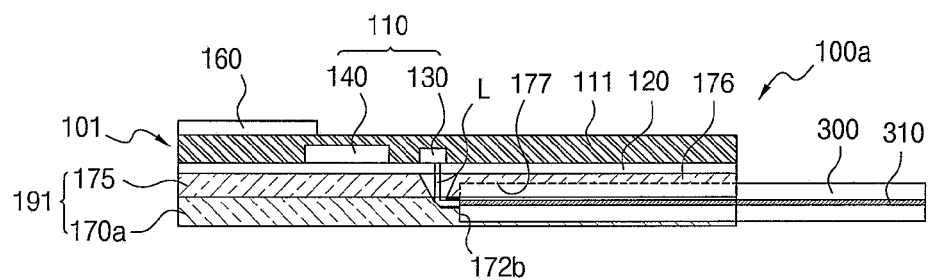
FIGS. 10A and 10B are a longitudinal cross-sectional view of an active optical cable (AOC) assembly according to a third embodiment of the present invention and a cross-sectional view showing a portion where an optical fiber is coupled in an optical sub-assembly (OSA), respectively.

In addition, in the second and third embodiments illustrated in FIGS. 9A and 10A to be described later, including the first embodiment illustrated in FIG. 2, the optical sub-assembly (OSA) may be implemented to be smaller than the optical element module. The alignment method using the guide pattern can be applied to the second and third embodiments.

When the optical sub-assembly (OSA) is implemented to be smaller than the optical element module, the alignment method of the optical sub-assembly (OSA) and the optical element module will be described with reference to FIGS. 13A and 13B.

Figure 13A:
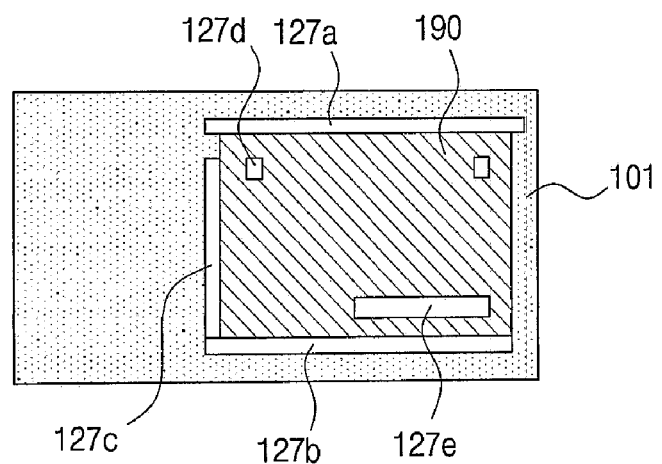
FIGS. 13A and 13B show an active optical cable (AOC) assembly according to a sixth embodiment of the present invention, and are an assembly plan view and a cross-sectional view, respectively, showing an optical subassembly (OSA) is aligned with an optical element module by using guide protrusions when the OSA is smaller than the optical element module.
Figure 13B:
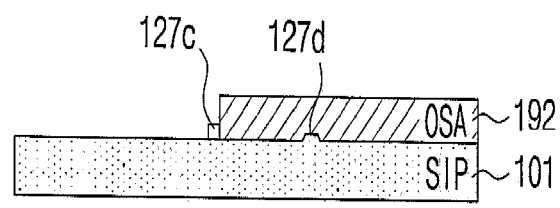

As shown in FIGS. 13A and 13B, when the optical sub-assembly (OSA) 190 is smaller than the optical element module 101, an alignment guide protrusion 127 is formed on the bonding surface of the optical element module 101 and an optical sub-assembly (OSA) 190 is easily arranged to the single optical element module 101 or the optical element module wafer 102 by using the alignment guide protrusion 127 in a pick-and-place manner.

In FIG. 13B, the alignment guide protrusion 127 includes: a pair of first and second guide protrusions 127a and 127b arranged in parallel at a distance corresponding to the width of the optical sub-assembly (OSA) 190 to accommodate the rectangular optical sub-assembly (OSA) 190 therein; and a third guide protrusion 127c arranged at right angles to block the end portion at one side of each of the first and second guide protrusions 127a and 127b. The first to third guide protrusions 127a to 127c are suitably formed to have a thickness of 20 μm to 50 μm.

In this case, it is preferable not to form a guide protrusion facing the third guide protrusion 127c in consideration of the arrangement of a plurality of optical fibers at the end portion of the other side of each of the first and second guide protrusions 127a and 127b. The first to third guide protrusions 127a to 127c have a structure of protruding from the bonding surface to surround the optical sub-assembly (OSA) 190.

In addition, the first and second alignment protrusions 127d and 127e which are aligned with the alignment grooves (not shown) formed in the bonding surface of the optical sub-assembly (OSA) 190 may be further included in the inner regions of the first to third guide protrusions 127a to 127c. In this case, the first alignment protrusion 127d may have a small protrusion shape, for example, and the second alignment protrusion 127e may have a linear protrusion shape having a predetermined length.

As described above, when the optical element module wafer 102 and the optical sub-assembly (OSA) wafer 190a are aligned in a wafer level alignment (WLA) manner, alignment between the optical element 130 and the mirror (optical component) and alignment between the mirror (optical component) and the optical fiber 300 may be aligned accurately at one time even by a passive method, to achieve high efficiency.

Thereafter, a process alloy (Eutectic Alloy) layer or an adhesive layer is formed on the optical sub-assembly (OSA) wafer 190a in advance, and then the two wafers 102 and 190a are bonded by applying heat in alignment with the optical element module wafer 102.

The process alloy layer may be implemented using, for example, an Au—Sn alloy, in which the hermetic sealing can be made. In addition, the adhesive layer, for example, benzocyclobutene (BCB), epoxy- or polyimide-based polymer adhesive may be used.

Subsequently, an optical engine package, that is, a connector plug 100, which can fix the optical fiber 300 by a dicing process of sawing and separately separating the bonded wafers, is manufactured in a semiconductor package type.

On one side of the optical engine package obtained as described above, an optical fiber insertion channel 301 into which a plurality of optical fibers 301 to 304 are inserted is formed as shown in FIG. 4.

In this case, at the inlet of the optical sub-assembly (OSA) wafer 190a forming the optical fiber insertion channel 301, that is, the support substrate 170, as shown in FIG. 3B, an inclined portion 173 may be formed to gradually widen the inlet to facilitate the insertion of the optical fibers 301 to 304.

The method of inserting the optical fibers 301 to 304 into the optical fiber insertion channel 301 of the optical engine package employs a method of filling an epoxy or polyimide-based adhesive into the inlet of the optical fiber insertion channel 301 by a predetermined capacity, picking up the optical fibers 301 to 304 one by one to then be pushed into the optical fiber insertion channel 301, using pick-and-push equipment, and curing the adhesive by irradiating heat or UV on the adhesive.

Figure 6B:
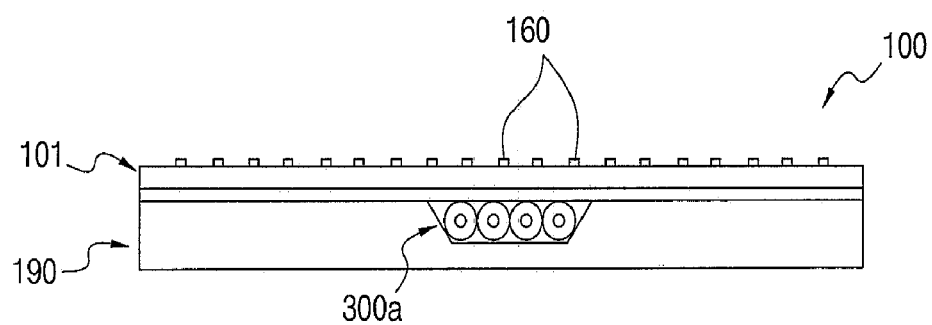
Figure 6C:
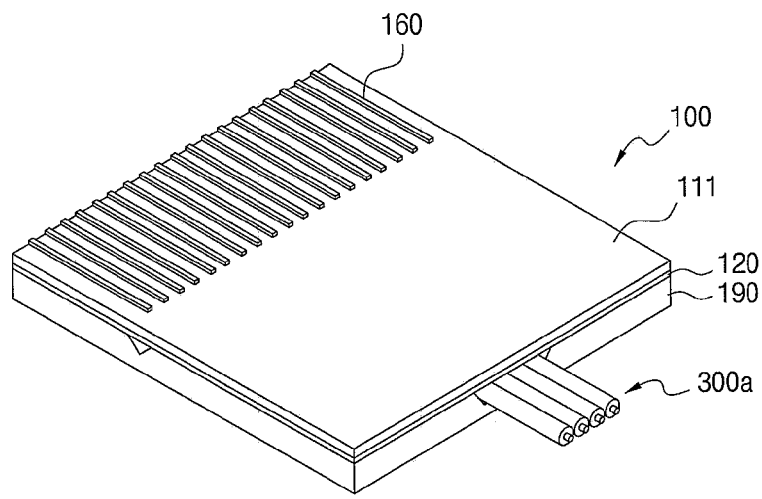

As described above, the connector plug 100 manufactured in the semiconductor package type has the data transmission standard of the high-definition multimedia interface (HDMI) as an external connection terminal 160 is formed in the form of a conductive strip on the outer surface of the optical element module 101, and is implemented as shown in FIGS. 6A to 6C.

In the illustrated embodiment, the external connection terminal 160 is formed to protrude on the outer surface of the optical element module 101, but the external connection terminal 160 may be formed at the same level as the outer surface of the optical element module 101.

Figure 6D:
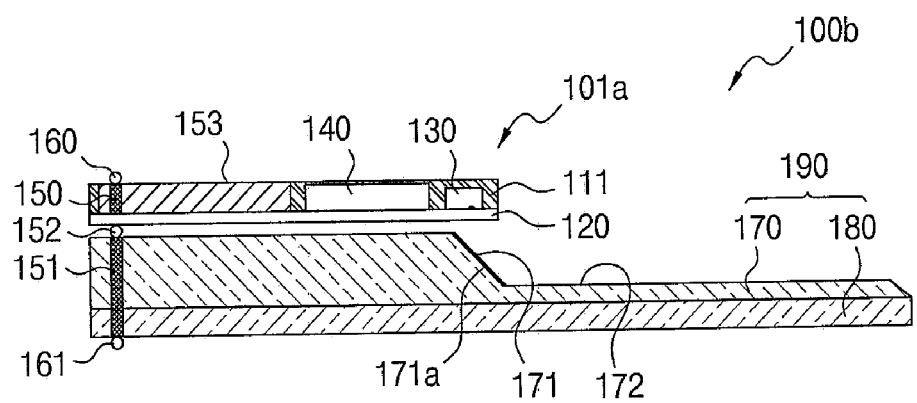

In addition, in the illustrated embodiment, the external connection terminal 160 is formed only on the outer surface of the optical element module 101, but, as shown in the modified embodiment shown in FIG. 6D, the conductive vertical via 151 may be formed in the vertical direction in the optical sub-assembly (OSA) 190, and may be connected using the solder balls 152 between the wiring layer 120 of the optical element module 101 and the conductive vertical via 151.

In the active optical cable (AOC) assembly according to a modified embodiment, the connector plug 100b is a type in which the optical fiber 300 is mounted without the optical fiber cover as compared with the first embodiment, and includes an optical element module 101a and an optical sub-assembly (OSA) 190 that supports the optical element module 101a and the optical fiber 300.

Compared with the optical element module 101 of the first embodiment, the optical element module 101a has a functionally identical structure except that the cover portion covering the upper portion of the optical fiber is deleted to reduce the length thereof.

Since the connector plug 100b according to the modified embodiment has no structure to cover the upper portion of the optical fiber 300, the optical element module 101a is mounted on one side of the support substrate 170 in a pick-and-place manner, and subsequently, the optical fiber 300 may be mounted in a pick-and-place manner in the optical fiber seating groove 172, so that the assembly may be easily performed.

In this case, the inner end of the optical fiber seating groove 172 serves as a stopper when assembling the optical element module 101a and the optical fiber 300 to the support substrate 170.

When assembling the optical fiber 300 to the optical fiber seating groove 172 of the support substrate 170. First, an epoxy or polyimide-based adhesive is filled into the optical fiber seating groove 172 by a predetermined capacity, the optical fiber 300 is assembled into the fiber seating groove 172, and then heat or UV is irradiated on the assembled optical fiber 300 to fix the optical fiber in a manner of curing the adhesive.

The connector plug 100b can reduce unnecessary area of the SIP package, that is, the optical element module 101a, thereby reducing the cost.

In addition, the connector plug 100b may be formed of two structures of the optical element module 101a and the optical sub-assembly (OSA), so that the entire thickness may be realized as a thin film.

In this case, a conductive strip or an external connection terminal 161 in the form of solder balls or metal bumps may be formed on the lower surface of the optical sub-assembly (OSA) 190, and it is also possible to have a high-definition multimedia interface (HDMI) data transmission standard on the upper and lower surfaces of the connector plug 100, respectively.

In this case, as the optical element module 101 forms a System In Package (SIP) in a FOWLP method using a semiconductor manufacturing process, the mold body 111 and the wiring layer 120 can be formed to be a thin film of 200 µm and 100 µm thick, respectively. The optical sub-assembly (OSA) 190 is manufactured to 700 µm while accommodating the optical fiber 300 having a diameter of 400 µm. As a result, the connector plug 100 of the present invention can realize a thickness of 1 mm, and produced in a small size of 8.20×9.30×1 mm in the width× length× height.

As described above, in the present invention, when the optical element module wafer 102 and the optical sub-assembly (OSA) wafer 190a are aligned in a wafer level alignment (WLA) manner, the optical element module 101 may have an assembly structure that can be used as a cover for fixing an optical fiber 300, to thereby implement a slim structure.

In addition, in the present invention, even if the passive alignment technique is used, the optical element module wafer 102 and the optical sub-assembly (OSA) wafer 190a are aligned in a wafer level alignment (WLA) manner. Accordingly, alignment between the optical element 130 and the mirror (optical component) and alignment between the mirror (optical component) and the optical fiber 300 can be made accurately, and can be made simply by one-time alignment.

An active optical cable (AOC) assembly according to a second embodiment of the present invention will be described with reference to FIGS. 9A to 9D.

A connector plug 100a used in an active optical cable (AOC) assembly according to the second embodiment includes: an optical sub assembly (OSA) 191 having an optical fiber seating groove 172 for accommodating and supporting one portion of the optical fiber 300 on one side thereof; an optical fiber cover 176 having an optical fiber seating groove 177 for accommodating and supporting the other portion of the optical fiber corresponding to the optical fiber seating groove 172 and coupled to an upper portion of the optical fiber seating groove 172, thereby forming an optical fiber insertion channel into which the optical fiber 300 is inserted; an optical element module 101 stacked on top of the optical sub-assembly 191 and the optical fiber cover 176 and having an optical engine 110 for generating or receiving an optical signal therein; and an optical component 171 installed in the optical sub-assembly to transfer the optical signal between the optical fiber and the optical engine.

Therefore, the same elements of the second embodiment as those of the first embodiment are given the same reference numerals as those of the first embodiment, and a detailed description thereof will be omitted.

When compared to the first embodiment, the active optical cable (AOC) assembly according to the second embodiment differs from that of the first embodiment, in that the optical element module 101 has a flat surface instead of forming a cover recess 122 in which the lower surface of the wiring layer 120 fixes the optical fiber 300, and the optical sub-assembly (OSA) 190 for holding the optical fiber 300 has been modified as follows.

In the second embodiment, the optical sub-assembly (OSA) 191 includes: for example, a support substrate 170a made of glass; an optical fiber cover 176 disposed between the one side of the support substrate 170a and the optical element module 101 to fix the optical fiber 300; and a spacer 175 filling a space between the other side of the support substrate 170a and the optical element module 101.

The optical fiber cover 176 and the spacer 175 are made of silicon, for example.

First, the optical fiber cover 176 and the spacer 175 are required to have the same height so as to make uniform bonding with the flat wiring layer 120 of the optical element module 101.

A plurality of optical fiber seating grooves 172 and 177 similar to the first embodiment are formed in the support substrate 170a and the optical fiber cover 176 so as to support the plurality of optical fibers 301 to 304, respectively.

In addition, a 45° reflective surface is formed on the support substrate 170a at a portion opposite to the core 310 of the optical fiber 300 seated in the optical fiber seating groove 172, and a metal layer is formed on the reflective surface. Accordingly, a mirror, that is, an optical component 171, that changes a path to be incident is formed on the support substrate 170a, such that the incident light L is directed to the core 310 of the optical fiber 300 disposed at right angles when the light L generated from the optical element 130 is incident perpendicularly to the optical subassembly (OSA) 191.

In this case, it is preferable to form inclined surfaces at portions where the spacer 175 and the optical fiber cover 176 oppose each other so that the light L generated from the optical element 130 does not interfere when reaching the mirror.

Figure 9D:
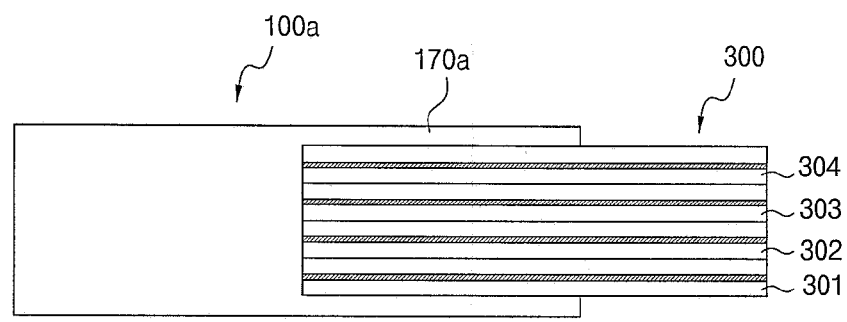

In addition, as shown in FIG. 9D, the support substrate 170a according to the second embodiment may remove a portion covering the upper portions of the plurality of optical fibers 301 to 304. In this case, when assembling the plurality of optical fibers 301 to 304 to the connector plug 100a, the plurality of optical fibers 301 to 304 can be mounted in a pick-and-place manner and thus can be easily assembled.

The second embodiment is different from the first embodiment in which the second embodiment requires a two-time wafer level alignment (WLA) in which the optical fiber cover 176 is aligned and assembled on the support substrate 170a and the optical element module 101 is aligned and assembled again, but the first embodiment performs a one-time wafer level alignment (WLA).

Figure 10B:
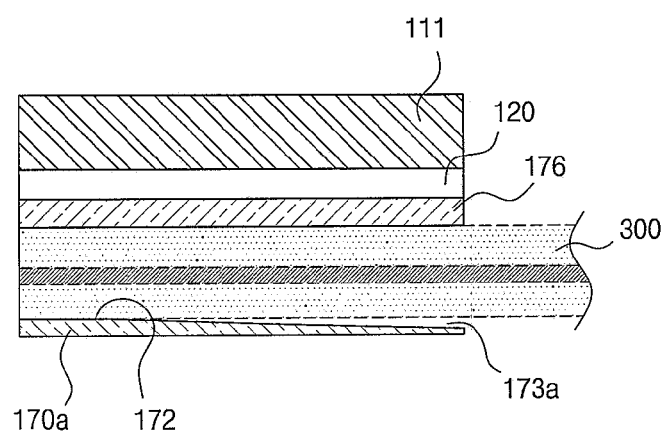

An active optical cable (AOC) assembly according to a third embodiment of the present invention will be described with reference to FIGS. 10A and 10B.

Therefore, the same elements of the third embodiment as those of the second embodiment are given the same reference numerals as those of the second embodiment, and a detailed description thereof will be omitted.

In the active optical cable (AOC) assembly according to the third embodiment, the connector plug 100a has the same remaining portion as the second embodiment, except for the portion where the optical fiber 300 is coupled in the subassembly (OSA) 191 as compared with the second embodiment.

A plurality of optical fiber seating grooves 172 and 177 similar to the first embodiment are formed in the support substrate 170a and the optical fiber cover 176 so as to accommodate and support the plurality of optical fibers 301 to 304, respectively.

Accordingly, when the optical fiber cover 176 is assembled to the support substrate 170a, an optical fiber insertion channel into which the optical fiber is inserted is formed. In this case, it is preferable to increase the depth of the optical fiber seating groove 172 from the inner side of the support substrate 170a toward the distal end portion thereof to facilitate the insertion of the optical fiber 300 into the optical fiber insertion channel. That is, the inlet 173a of the optical fiber insertion channel is set wider in the upper and lower width than in the inner side.

As a result, the active optical cable (AOC) assembly according to the third embodiment picks up the optical fibers 300 one by one using pick-and-push equipment compared to the second embodiment and pushes and inserts the picked optical fiber 300 into the optical fiber insertion channel, to thereby easily make an assembly process.

Figure 11B:
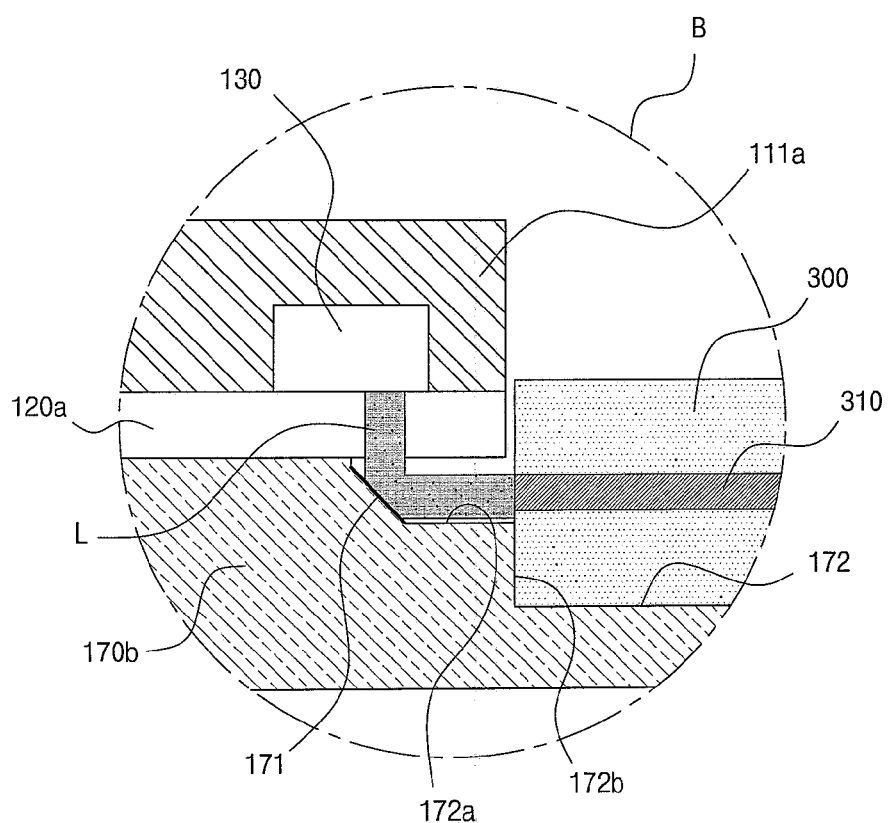

An active optical cable (AOC) assembly according to a fourth embodiment of the present invention will be described with reference to FIGS. 11A and 11B.

Therefore, the same elements of the fourth embodiment as those of the first embodiment are given the same reference numerals as those of the first embodiment, and a detailed description thereof will be omitted.

In the active optical cable (AOC) assembly according to the fourth embodiment, the connector plug 100b is a type in which the optical fiber 300 is mounted without the optical fiber cover as compared with the first to third embodiments, and includes an optical element module 101a and a support substrate 170b that supports the optical element module 101a and the optical fiber 300.

Compared with the optical element module 101 of the first embodiment, the optical element module 101a has a functionally identical structure except that the cover portion covering the upper portion of the optical fiber is deleted to reduce the length thereof.

That is, in the optical element module 101a, the optical engine 110 including the optical element 130 and the optical IC 140 is integrated in the form of a flip chip. The optical element module 101a is a SIP package in which the outer periphery thereof is surrounded by a mold body 111 molded with an epoxy mold compound (EMC), and a wiring layer 120 for protecting the optical element 130 and the optical IC 140 and electrically connecting them is formed at the bottom surface thereof.

The support substrate 170b has one-side bottom surface in contact with the wiring layer 120a of the optical element module 101a in order to stably support the optical element module 101a and the optical fiber 300. An extension portion 170c is formed upwardly so that one-side end portion receives and supports one side surface of the optical element module 101a. In addition, an optical fiber seating groove 172 to support the optical fiber 300 is formed on the bottom of the other side of the support substrate 170b.

The support substrate 170b may be made of silicon (Si), glass, or plastic, and may be manufactured at a wafer level.

In addition, a 45° reflective surface is formed on the support substrate 170b at a portion opposite to the core 310 of the optical fiber 300 seated in the optical fiber seating groove 172, and a metal layer is formed on the reflective surface. Accordingly, a mirror, that is, an optical component 171, that changes a path to be incident is formed on the support substrate 170b, such that the incident light L is directed to the core 310 of the optical fiber 300 disposed at right angles when the light L generated from the optical element 130 is incident perpendicularly to the support substrate 170b constituting the optical sub-assembly (OSA).

In addition, a stepped portion 172a is formed between the 45° reflective surface on which the metal layer is formed and the inner end portion 172b of the optical fiber seating groove 172. The inner end 172b is configured to provide a stop to set a predetermined distance between the end face of the optical fiber 300 and the 45° reflective surface during assembly of the optical fiber 300.

Since the connector plug 100b according to the fourth embodiment has no structure to cover the upper portion of the optical fiber 300, the optical element module 101a is mounted on one side of the support substrate 170b in a pick-and-place manner, and subsequently, the optical fiber 300 may be mounted in a pick-and-place manner in the optical fiber seating groove 172, so that the assembly may be easily performed.

In this case, the inner end portion 172b of the optical fiber seating groove 172 in the support substrate 170b is set so that the distal end portion of the assembled optical fiber 300 coincides with the end portion of the optical element module 101a.

Therefore, the extension portion 170c of the support substrate 170b and the inner end portion 172b of the optical fiber seating groove 172 serve as a stopper when assembling the optical element module 101a and the optical fiber 300 to the support substrate 170b.

When assembling the optical fiber 300 to the optical fiber seating groove 172 of the support substrate 170b, First, an epoxy or polyimide-based adhesive is filled into the optical fiber seating groove 172 by a predetermined capacity, the optical fiber 300 is assembled into the fiber seating groove 172, and then heat or UV is irradiated on the assembled optical fiber 300 to fix the optical fiber in a manner of curing the adhesive.

The connector plug 100b according to the fourth embodiment can reduce unnecessary area of the SIP package, that is, the optical element module 101a, thereby reducing the cost.

In addition, the connector plug 100b according to the fourth embodiment may be formed of two structures of the optical element module 101a and the support substrate 170b, so that the entire thickness may be realized as a thin film.

Figure 12:
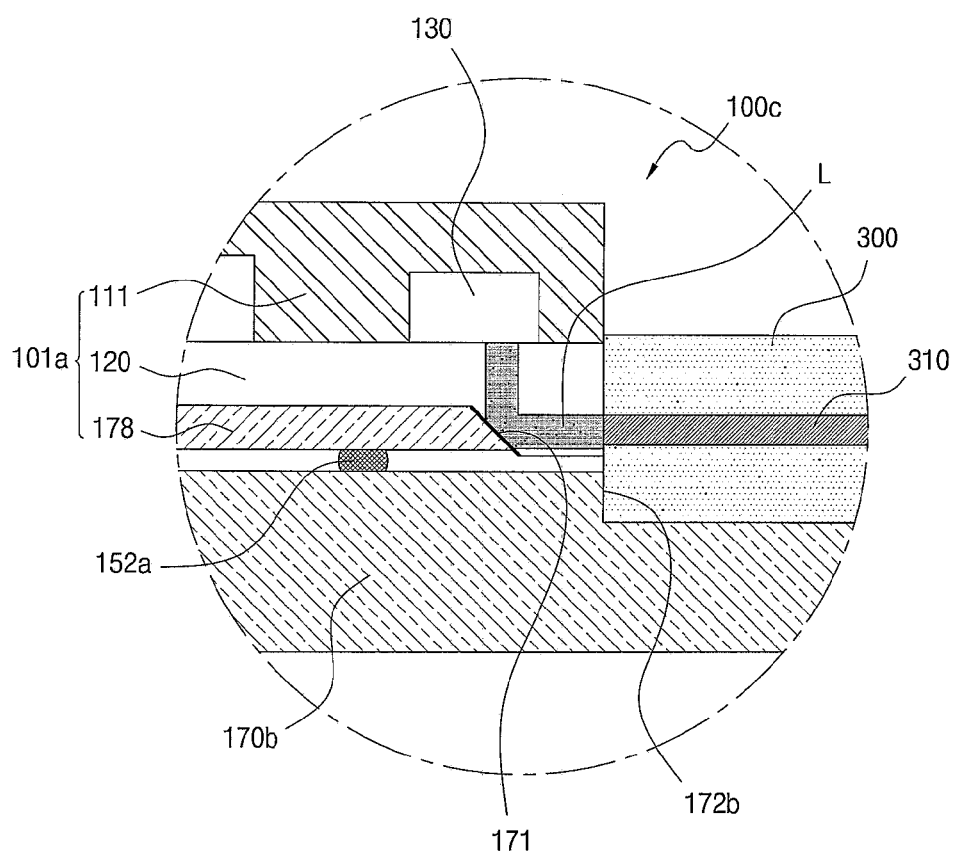
FIG. 12 is a cross-sectional view of an active optical cable (AOC) assembly according to a fifth embodiment of the present invention.

An active optical cable (AOC) assembly according to a fifth embodiment of the present invention will be described with reference to FIG. 12.

Therefore, the same elements of the fifth embodiment as those of the fourth embodiment are given the same reference numerals as those of the fourth embodiment, and a detailed description thereof will be omitted.

In the active optical cable (AOC) assembly according to the fifth embodiment, the connector plug 100c is a type for mounting the optical fiber 300 without the optical fiber cover. When compared with the fourth embodiment, there is a difference between the fifth embodiment and the fourth embodiment in a structure in which a metal layer is formed on a 45° reflective surface to form a mirror for changing a path.

That is, in the fifth embodiment, a mirror for changing the path of light is integrally formed under the wiring layer 120 of the optical element module 101a. When the optical element module 101a is manufactured in the form of a SIP package as in the fourth embodiment, the optical element module 101a includes a wiring layer 120 in which wiring patterns 123a and 123b for interconnecting the optical engine 110 and the external connection terminal 160 are embedded. The lower surface of the wiring layer 120 may use a transparent polyimide as an insulating layer.

The polyimide insulating layer facing the optical element 130 may be etched to form a 45° reflective surface, and a metal layer may be formed on the reflective surface to form a mirror, that is, an optical component 171, to change the path of light.

In addition, a planarization layer 178 is formed under the wiring layer 120 and the reflective surface, for example, with polyimide, to serve as a spacer for bonding the support substrate 170b.

In this case, when the refractive index of the planarization layer 178 is lower than the refractive index of the polyimide insulating layer on which the optical component 171 is formed, even if the metal layer is not formed on the reflective surface, the light generated from the optical element 130 and incident on the reflective surface may be totally reflected at the 45° reflecting surface due to the difference in refractive index, so that the path of the light may be refracted at right angles.

In addition, a ball grid array (BGA) 152a may be formed under the polyimide insulating layer 178 to align the optical element module 101a and the support substrate 170b. In this case, alignment between the optical element module 101a and the support substrate 170b may be performed by a self-alignment method using a ball grid array (BGA) 152a.

As described above, in the fifth embodiment, alignment between the optical element 130 and the optical component 171 is more accurately realized by integrally forming the optical component 171 for changing the path of light in the optical element module 101a.

In the first to fourth embodiments, a reflective surface is formed on the support substrates 170 to 170b of the optical subassemblies (OSAs) 190 and 191 facing the optical element modules 101 and 101a, and a metal layer is formed on the reflective surface. Accordingly, a mirror for changing the path, that is, the optical component 171 is formed. However, as in the fifth embodiment, it is also possible to integrally form the optical component 171 for changing the path of light in the optical element module 101a.

In addition, in the above embodiment, it has been described that the metal layer is formed on the reflective surface to form a mirror for changing a path. Even when the metal layer is not formed on the reflective surface, the reflectance of light may be reduced, and thus may serve as a mirror, thereby forming the optical component 171.

Furthermore, although the reflective surface is set to 45°, it is also possible to set smaller or larger than 45° according to the need to change the optical path.

In the present invention, the optical element module wafer and the optical sub-assembly (OSA) wafer in which the optical fiber is accommodated are aligned by the wafer level alignment (WLA) method using a passive alignment technology. Accordingly, alignment between the optical element and the mirror and alignment between the mirror and the optical fiber can be made without misalignment, thereby reducing optical loss, and the connector plug can be implemented in a slim structure.

As a result, the present invention can solve the problem of the alignment cost and the resulting increase in manufacturing cost, which is the biggest barrier to the spread of active optical cable (AOC), and provides a packaging method that guarantees superior performance than the existing packaging method.

In the above description of the embodiment, the first connector plug connected to one end of the optical cable has been described, but a second connector plug connected to the other end of the optical cable may have the same configuration. However, when the optical element of the optical engine included in the first connector plug uses a laser diode that generates an optical signal, the optical element of the optical engine included in the second connector plug uses a photodiode that receives an optical signal. In this matter, there is a difference between the first connector plug and the second first connector plug.

The connector plug according to an embodiment of the present invention comprises an external connection terminal 160 in the form of a plurality of conductive strips, solder balls, or metal bumps that meet one of the data transmission standards so as to interconnect a terminal with another terminal while forming an active optical cable (AOC).

In addition, the external connection terminal 160 of the connector plug may be variously modified in addition to the data transmission standard.

When the external connection terminal 160 is formed of a plurality of conductive strips as shown in FIGS. 6A and 6B, the connector plug 100 according to an embodiment of the present invention can be applied to the case where the connector plug 100 is physically attached to and detached from the mating port 12 of the terminal 10 as shown in FIG. 1.

The case where the external connection terminal 160 is formed in the form of solder balls or metal bumps can be applied to: board-to-board interconnection, chip-to-chip interconnection, and board-to-chip interconnection within one terminal; or on-board interconnection that interconnects the terminal main board and peripheral I/O devices.

In this case, the connector plug 100 is soldered and fixedly coupled to the conductive electrode pads formed on the board using solder balls or metal bumps as one chip instead of physically detachable coupling to the mating port 12.

As described above, the omission of physical mating port-connector plug coupling results in on-board interconnection without going through electrical I/O interfacing or optical interfacing.

As a result, when on-board interconnections are made, the signal path is reduced to a minimum, to thereby reduce signal degradation and jitter, improve signal integrity, reduce data errors caused by parasitic current components in the signal path, and to reduce the overall board development effort, resulting in lower engineering costs.

Figure 14A:
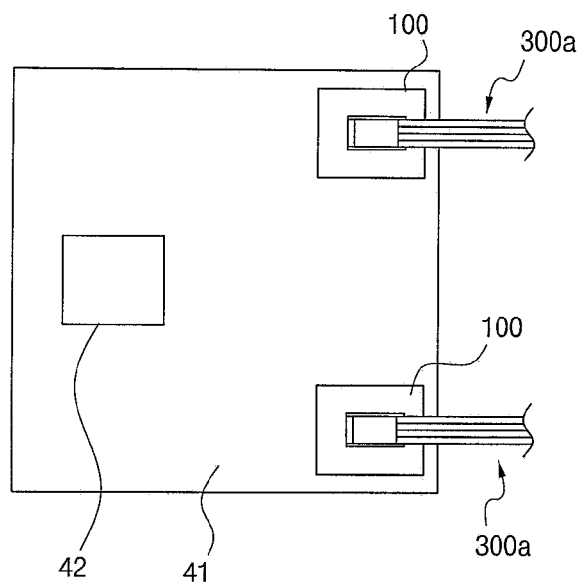
FIGS. 14A and 14B are a plan view and a cross-sectional view, respectively, showing a seventh embodiment in which a connector plug 100 of the present invention is on-board-interconnected to a board.
Figure 14B:
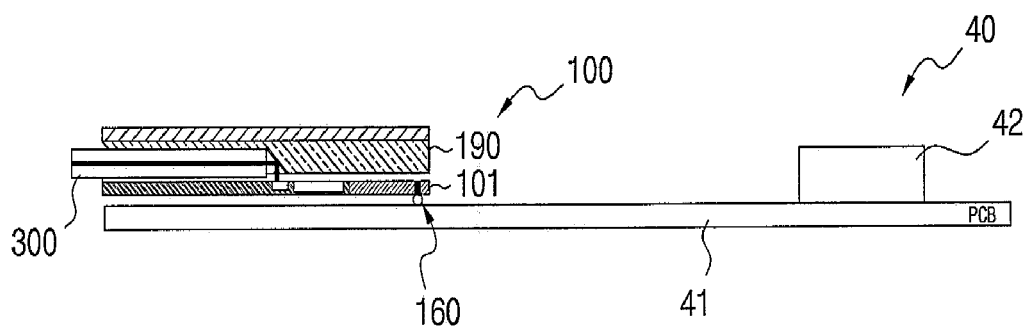

FIGS. 14A and 14B are a plan view and a cross-sectional view, respectively, showing a seventh embodiment in which a connector plug of the present invention is on-board-interconnected to a board.

Referring to FIGS. 14A and 14B, an on-board interconnection structure in which the connector plug according to the seventh embodiment is mounted directly on a board is the case that an external connection terminal 160 of a connector plug 100 made of solder balls or metal bumps is fixedly coupled to a conductive electrode pad formed on a board 41 constituting, for example, a field programmable gate arrays (FPGA), a DSP, a controller, or the like.

That is, after matching the external connection terminal 160 made of solder balls or metal bumps with the conductive electrode pad formed on the board 41, the interconnection between the connector plug 100 and the board 41 is made through a reflow process. In this case, the electrode pad of the board 41 coupled to the solder ball of the external connection terminal 160 may be formed of, for example, a ball grid array (BGA), a quad flat non-leaded package (QFN), or the like.

The board 41 may be, for example, a printed circuit board (PCB) used to configure an FPGA, a complex programmable logic device (CPLD), or the like and a plurality of integrated circuit (IC) chips and electronic components 42 may be mounted on the board 41.

FPGAs are generally applied in functional systems in a variety of fields, including digital signal processors (DSPs), early ASICs, software-defined radios, voice recognition, and machine learning systems. One or two connector plugs 100 may be directly coupled to the board 41, and may serve to directly connect these the functional systems to other functional boards (systems) or terminals through the optical cable 300a, respectively.

Furthermore, a connector plug 100 or active optical cable (AOC) assembly having an external connection terminal 160 made of solder balls or metal bumps is transponder chip having both an electro-optical conversion function and an opto-electric conversion function. Integrated circuit (IC) chips having a plurality of different functions are integrated into a single package in a system-in-package (SiP) form, various functions are embedded in a single chip, including the connector plug 100 in the form of a system on chip (SOC), or the package may be made in the form of a system on board (SoB) or a package on package (PoP).

An integrated circuit (IC) chip or functional device that may be packaged together in the form of SiP, SoC, SoB or PoP may include: for example, as a processor having a signal processing function, an integrated circuit chip of a central processing unit (CPU), a microprocessor unit (MPU), a micro controller unit (MCU), a digital signal processor (DSP), and an image signal processor (ISP), automotive electronic control units (ECUs) that require a plurality of integrated circuits (ICs) for various multifunction processing, and integrated circuit chips (IC chips) such as autonomous vehicles and artificial intelligence (AI).

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be applied to an active optical cable (AOC) used for large-capacity data transmission between a PCB and another PCB, and between an UHDTV-class TV and a peripheral device at a high speed of several tens of giga to 100 giga.

What is claimed is:

1. An optical element module comprises:
   a mold body having a first surface formed on top of the mold body and a second surface formed on a bottom of the mold body;
   an external connection terminal formed on the first surface of the mold body and electrically connected to an outside;
   an optical engine embedded between the first surface and the second surface of the mold body, sealed by the mold body, and having a connection pad thereof, wherein the connection pad of the optical engine is exposed in the second surface of the mold body;
   a conductive vertical via penetrating the first surface and the second surface of the mold body, one end of the conductive vertical via being electrically connected to the external connection terminal; and
   a wiring layer formed on the second surface of the mold body and connecting another end of the conductive vertical via and the connection pad of the optical engine to each other,
   wherein the wiring layer comprises: a wiring pattern for interconnecting the conductive vertical via and the optical engine; and an insulating layer coating the wiring pattern,
   wherein the insulating layer comprises: a transparent insulating layer,
   wherein the optical engine comprises: an optical element configured to receive an optical signal in a vertical direction through the transparent insulating layer, or to generate an optical signal, and
   wherein the optical element is configured to convert an electrical signal into an optical signal and/or an optical signal into an electrical signal.

2. The optical element module of claim 1, further comprising:
   guide protrusion patterns which are integrally formed to the wiring layer in order to align and assemble the optical element module on a support substrate.

3. The optical element module of claim 2, wherein the support substrate has an optical fiber seating groove on which an optical fiber is mounted.

4. The optical element module of claim 1, further comprising: a reflective surface layer having a reflective surface integrally formed to the wiring layer and transmitting an optical signal generated or received by the optical engine between an optical fiber and the optical engine through the wiring layer.

5. The optical element module of claim 1, wherein the conductive vertical via is formed on a via board sealed by the mold body.

6. The optical element module of claim 1, further comprising a lens formed on a surface of the insulating layer facing an optical component to change a path of light generated from the optical engine,
wherein the insulating layer is transparent.

7. The optical element module of claim 1, wherein the external connection terminal is formed in the form of solder balls or metal bumps.

8. The optical element module of claim 1, further comprising:
at least one of a chip for signal processing, an encoder, a decoder, a passive element, and a power chip.

9. The optical element module of claim 1, wherein the optical engine comprises a light emitting device or a light receiving device.

10. The optical element module of claim 9, wherein the optical engine comprises an optical integrated circuit (IC) for controlling an optical interface by controlling the light emitting device or the light receiving device.

11. A connector plug comprising:
an optical sub-assembly (OSA) in which an optical fiber seating groove on which an optical fiber is mounted is formed on one side of the OSA;
an optical element module having an optical engine combined with the OSA and generating or receiving an optical signal; and
an optical component installed on the OSA and transmitting the optical signal between the optical fiber and the optical engine,
wherein the optical element module comprises:
a mold body having a first surface formed on top of the mold body and a second surface formed on a bottom of the mold body;
an external connection terminal formed on the first surface of the mold body and electrically connected to an outside;
an optical engine embedded between the first surface and the second surface of the mold body, sealed by the mold body, and having a connection pad thereof, wherein the connection pad of the optical engine is exposed in the second surface of the mold body;
a conductive vertical via penetrating the first surface and the second surface of the mold body, one end of the conductive vertical via being electrically connected to the external connection terminal; and
a wiring layer formed on the second surface of the mold body and connecting another end of the conductive vertical via and the connection pad of the optical engine to each other, and
wherein the optical fiber is supported on the wiring layer.

12. The connector plug of claim 11, wherein the optical engine of the optical element module comprises:
an optical element for generating an optical signal in a vertical direction on the second surface of the mold body or receiving an optical signal; and
an optical integrated circuit for controlling the optical interface by controlling the optical element,
the optical sub-assembly comprises a support substrate having a reflective surface at a point where the optical fiber seating groove is formed at one side and the first direction along the optical fiber seating groove and the optical signal direction of the optical element cross each other, and
the optical component is formed on the reflective surface to transfer an optical signal between the optical fiber and the optical engine.

13. The connector plug of claim 12, wherein the optical component is formed of the reflective surface of the optical sub-assembly and
the reflective surface is installed on a position facing the optical element.

14. The connector plug of claim 11, wherein the connector plug is coupled to a mating port or a circuit board of a terminal.

15. The connector plug of claim 11, wherein the connector plug is applied to an on-board interconnection of any one from between a PCB and another PCB, between a chip and another chip, and between a PCB and a chip.

16. The connector plug of claim 11, wherein the connector plug is embedded in an integrated circuit chip.

17. An active optical cable (AOC) assembly comprising:
a connector plug having an optical fiber insertion channel; and
at least one optical fiber coupled to the optical fiber insertion channel,
wherein the connector plug comprises:
an optical sub-assembly (OSA) in which an optical fiber seating groove on which an optical fiber is mounted is formed on one side of the OSA and a reflective surface is formed on an inner end of the optical fiber seating groove;
an optical element module according to claim 1, wherein the optical element module is stacked on the OSA and generates an optical signal or receives an optical signal; and
an optical component installed on the reflective surface of the OSA and transmitting the optical signal between the optical fiber and the optical engine.

18. The active optical cable (AOC) assembly of claim 17, wherein reflective surface shifts an optical path by a total reflection using the difference in refractive index.

* * * * *